US011100577B1

(12) United States Patent
O'Hagan et al.

(10) Patent No.: US 11,100,577 B1
(45) Date of Patent: Aug. 24, 2021

(54) ANONYMOUS TRADING SYSTEM

(75) Inventors: James A. O'Hagan, Englishtown, NJ (US); Brian Andreyko, Colts Neck, NJ (US)

(73) Assignee: NEX Services North America LLC, Wilmington, DE (US)

(*) Notice: Subject to any disclaimer, the term of this patent is extended or adjusted under 35 U.S.C. 154(b) by 0 days.

(21) Appl. No.: 13/212,524

(22) Filed: Aug. 18, 2011

Related U.S. Application Data

(60) Provisional application No. 61/375,352, filed on Aug. 20, 2010.

(51) Int. Cl.
*G06Q 40/00* (2012.01)
*G06Q 40/04* (2012.01)

(52) U.S. Cl.
CPC .............. *G06Q 40/04* (2013.01); *G06Q 40/00* (2013.01)

(58) Field of Classification Search
CPC ........ G06Q 30/08; G06Q 40/00; G06Q 40/04; G06Q 40/06
USPC .......................................................... 705/37
See application file for complete search history.

(56) References Cited

U.S. PATENT DOCUMENTS

| | | | |
|---|---|---|---|
| 5,136,501 A | 8/1992 | Silverman et al. | |
| 5,375,055 A | 12/1994 | Togher et al. | |
| 6,012,045 A | 1/2000 | Barzilai et al. | |
| 6,317,727 B1 | 11/2001 | May | |
| 6,421,653 B1 | 7/2002 | May | |
| 6,519,574 B1 | 2/2003 | Wilton et al. | |
| 7,162,447 B1* | 1/2007 | Cushing | G06Q 30/0283 705/35 |
| 7,171,386 B1* | 1/2007 | Raykhman | G06Q 40/04 705/37 |
| 7,184,982 B1* | 2/2007 | Howorka | G06Q 30/08 705/36 R |
| 7,613,640 B2* | 11/2009 | Horsfall | G06Q 30/08 705/35 |
| 7,634,438 B2 | 12/2009 | Penney | |
| 7,672,893 B1 | 3/2010 | Naratil | |
| 7,689,495 B1* | 3/2010 | Kim | G06Q 40/00 705/35 |
| 7,693,774 B2* | 4/2010 | Howorka | G06Q 30/08 705/37 |

(Continued)

FOREIGN PATENT DOCUMENTS

| | | |
|---|---|---|
| EP | 0 407 026 A2 | 1/1991 |
| EP | 0 411 748 A2 | 2/1991 |

(Continued)

OTHER PUBLICATIONS

Eric Clemons et al., "Restructuring Institutional Block Trading: An Overview of the OptiMark System," 1998, IEEE, pp. 301-310 (Year: 1998).*

(Continued)

*Primary Examiner* — Kenneth Bartley
(74) *Attorney, Agent, or Firm* — Lempia Summerfield Katz LLC

(57) ABSTRACT

A computerised method of trading a fungible instrument, the method comprising: receiving orders from traders for a fungible instrument. The orders each comprise an amount of the fungible instrument to buy or sell, but no price. The orders are matched. The price of matched orders is then fixed at a price based on an outside source at a predetermined time.

34 Claims, 18 Drawing Sheets

(56) References Cited

U.S. PATENT DOCUMENTS

| | | | |
|---|---|---|---|
| 7,778,853 B2 * | 8/2010 | Sussman | G06Q 10/02 705/37 |
| 7,925,566 B1 | 4/2011 | Naratil | |
| 7,991,683 B2 | 8/2011 | Setz | |
| 8,055,572 B2 * | 11/2011 | Schoen | G06Q 40/025 705/37 |
| 8,571,965 B2 * | 10/2013 | Rowell | G06Q 40/02 705/35 |
| 8,595,120 B1 * | 11/2013 | Newell | G06Q 40/04 705/37 |
| 8,732,065 B1 * | 5/2014 | Hayes, Jr. | G06Q 30/06 235/451 |
| 2001/0037284 A1 * | 11/2001 | Finkelstein et al. | 705/37 |
| 2001/0042040 A1 * | 11/2001 | Keith | 705/37 |
| 2002/0026400 A1 * | 2/2002 | Narayan | G06Q 30/08 705/37 |
| 2002/0035534 A1 | 3/2002 | Buist et al. | |
| 2002/0091617 A1 | 7/2002 | Keith | |
| 2002/0091624 A1 | 7/2002 | Glodjo et al. | |
| 2002/0111896 A1 * | 8/2002 | Ben-Levy et al. | 705/37 |
| 2002/0133455 A1 * | 9/2002 | Howorka et al. | 705/37 |
| 2002/0161690 A1 | 10/2002 | McCarthy et al. | |
| 2003/0009421 A1 | 1/2003 | Bansal et al. | |
| 2003/0018561 A1 | 1/2003 | Kitchen et al. | |
| 2003/0055776 A1 * | 3/2003 | Samuelson | 705/37 |
| 2003/0177126 A1 * | 9/2003 | Weingard | G06Q 40/04 |
| 2004/0044609 A1 | 3/2004 | Moore | |
| 2004/0059666 A1 * | 3/2004 | Waelbroeck et al. | 705/37 |
| 2004/0181474 A1 * | 9/2004 | Grubb et al. | 705/35 |
| 2004/0186806 A1 * | 9/2004 | Sinclair et al. | 705/37 |
| 2005/0171895 A1 * | 8/2005 | Howorka et al. | 705/37 |
| 2006/0059075 A1 * | 3/2006 | Hurewitz | G06Q 30/08 705/37 |
| 2006/0059079 A1 | 3/2006 | Howorka | |
| 2006/0095344 A1 * | 5/2006 | Nakfoor | G06F 21/33 705/26.1 |
| 2006/0100954 A1 * | 5/2006 | Schoen | 705/37 |
| 2006/0253374 A1 * | 11/2006 | Addock | G06Q 40/00 705/37 |
| 2006/0253380 A1 * | 11/2006 | Adcock | G06Q 40/04 705/37 |
| 2006/0259391 A1 * | 11/2006 | Schoen | G06Q 20/10 705/37 |
| 2007/0083457 A1 * | 4/2007 | Evelyn | G06Q 40/04 705/37 |
| 2007/0106594 A1 * | 5/2007 | Vlahoplus et al. | 705/37 |
| 2007/0112693 A1 * | 5/2007 | Cushing | G06Q 30/0283 705/400 |
| 2007/0239591 A1 | 10/2007 | May | |
| 2009/0125451 A1 * | 5/2009 | Rowell | G06Q 40/02 705/36 R |
| 2009/0276363 A1 * | 11/2009 | Newhouse | G06Q 40/04 705/80 |
| 2009/0281911 A1 * | 11/2009 | Sinclair et al. | 705/26 |
| 2009/0292635 A1 * | 11/2009 | Sinclair et al. | 705/37 |
| 2010/0198423 A1 * | 8/2010 | Hirst | 700/292 |

FOREIGN PATENT DOCUMENTS

| | | |
|---|---|---|
| GB | 2 363 876 A | 6/2000 |
| WO | WO-01 59661 A2 | 8/2001 |

OTHER PUBLICATIONS

The International Search Report issued in the parent PCT application, International PCT Appl No. PCT/US03/33149, dated Oct. 7, 2004.

Financial Markets IT/FT press clipping dated Jun. 3, 2002.

Citibank Press Release: Instinet and Citibank Announce Strategic Alliance to Create the Instinet FX Cross. May 20, 2002, New York.

InvestorWords (http://www.investorwords.com/2822 /limit_order.html).

\* cited by examiner

| WM FIX TRADE PERIOD | | | | | | ECB FIX TRADE PERIOD | | | | |
|---|---|---|---|---|---|---|---|---|---|---|
| 09:58:30 WM TRADE OPEN | 10:56:30 WM TRADE CLOSE WARNING | 10:58:30 WM TRADE CLOSE | 11:00:00 WM FIX TIME | 11:xx:xx WM RATE RECEIPT | 12:30:00 WM FSP MSG (RATE NOT RECVD) | 12:13:30 ECB TRADE OPEN | 12:11:30 ECB TRADE CLOSE WARNING | 13:13:30 ECB TRADE CLOSE | 13:15:00 ECB FIX TIME | 13:xx:xx ECB RATE RECEIPT |

| DATA | FORMAT | SAMPLE FSP VALUE | TRADING SYSTEM TRANSLATION TO GMT (A TIME REFERENCE) |
|---|---|---|---|
| FIX SOURCE | STRING | AA | |
| CURRENCY PAIRS | STRING | EUR/USD, EUR/AUD,... | |
| TRADE OPEN | HH:MM:SS | 02:01:30 | 17:58:30 |
| TRADE CLOSE WARNING | HH:MM:SS | 00:03:30 | 19:56:30 |
| TRADE CLOSE | HH:MM:SS | 00:01:30 | 19:58:30 |
| FIX SOURCE LOCAL TIME | HH:MM | 16:00:00 | 20:00:00 |
| FIX SOURCE LOCAL TIME ZONE | STRING | EDT | |

| DATE/TIME | TRADER | MAKER TAKER | CPARTY FLOOR | CPARTY TRADER | BUY SELL | ORDER TYPE | CURRENCY | PRICE | SIZE | REFERENCE NO. | OUR TICKET# | THEIR TICKET# |
|---|---|---|---|---|---|---|---|---|---|---|---|---|
| 01 JUL 15:60 | AJA | T | NYBD | T04 | SELL | | SAU/USD | 917.10 | 3 | FFD1-09BA-0000-01 | 27725 | 27084 |
| 01 JUL 15:50 | AJA | T | NYBD | T04 | BUY | | SAU/USD | 917.15 | 2 | FFD1-09BA-0000-03 | 27727 | 27086 |
| 01 JUL 15:50 | AJA | T | NYBD | T04 | BUY | | SAU/USD | 917.15 | 3 | FFD1-09BA-0000-02 | 27726 | 27085 |
| 01 JUL 15:53 | AJA | M | NYBD | T04 | BUY | | SAU/USD | 917.05 | 5 | FFD1-09BA-0000-04 | 27728 | 27087 |
| 01 JUL 15:56 | AJA | M | NYBD | T04 | BUY | | SAU/USD | 917.25 | 5 | FFD1-09BA-0000-05 | 27729 | 27088 |

SORTED BY: TIME/CURRENCY/COUNTERPARTY

LAST REFRESH: 20:01:28 GMT    TOTAL = 3 EBS DEALS (2 MAKES/ 1 TAKES)

FIGURE 16

| DATA | FORMAT | SAMPLE VALUE | COMMENTS |
|---|---|---|---|
| FIX LOCAL TIME | HH:MM | 11:00 | |
| FIX SOURCE | STRING | WM | |
| FIX DATE | DDMMYYYY | 31072009 | |
| FIXING RATE INFORMATION | | | |
| → TIME STAMP | HH:MM | 16:00 | TIME FIX RATE SENT TO TRADING SYSTEM FROM NRM |
| → CURRENCY PAIR | STRING | AUD/USD | |
| → RATE | NUMBER | 0.7382 | |

FIGURE 17

|  | TO | | | |
|---|---|---|---|---|
| FLOOR | TFA1 | TFA2 | TFB1 | TFB2 |
| TFA1 | 0 | 1 | 0 | 1 |
| TFA2 | 1 | 1 | 0 | 1 |
| TFB1 | 0 | 1 | ///// | ///// |
| TFB2 | 1 | 0 | ///// | ///// |

FROM (row label)

FIGURE 21B

|  | AI PROVIDES: DEAL CODE THROUGHPUT ALLOCATION | AI PROVIDES: TRADER THROUGHPUT ALLOCATION | TRADING SYSTEM CALCULATES: DEAL CODE CURRENT USAGE |
|---|---|---|---|
| TRADER 1 SIGNS ON | 30 | 10 | 10 |
| TRADER 2 SIGNS ON | 30 | 5 | 15 |
| TRADER 3 SIGNS ON | 30 | 20 | SIGN ON REJECTS. DO NOT APPLY ALLOCATION 15 |
| TRADER 4 SIGNS ON | 30 | 4 | 19 |
| TRADER 1 SIGNS OFF | 30 | --- | 9 |

ANONYMOUS TRADING SYSTEM

CROSS REFERENCE TO RELATED APPLICATION

This application claims benefit under 35 U.S.C. § 119(e) to U.S. Provisional application No. 61/375,352, filed Aug. 20, 2010, the entirety of which is incorporated herein by reference.

FIELD OF THE INVENTION

This invention relates to anonymous trading systems for trading fungible instruments, and in particular computerised anonymous trading systems.

BACKGROUND OF THE INVENTION

Anonymous trading systems are used widely to trade fungible instruments, particularly financial instruments such as foreign exchange (FX) products. These systems have been very successful and are used for the majority of transactions in some instruments, for example FX spot.

As their name suggests, anonymous trading systems do not allow the participants to know the identity of potential counterparties to a transaction until the trade has been confirmed. One known system described in European patent application No. EP-A-625275 and illustrated in FIG. 1A, requires traders to input quotes in the forms of bids and offers into the system via their trader terminals or workstations. These quotes are matched with other quotes in the system by a matching engine or arbitrator. Where a match is found, a deal will be executed between the parties, once it has been established that each party has sufficient credit with the other for the deal. A market distributor is arranged between the arbitrator and a bank node, at which is stored a credit matrix indicative of credit assigned by a bank to all counterparties on the system.

The market distributor is responsible for constructing a market view for each trade floor based on their credit as represented by the binary credit matrix stored at the market distributor. Thus, traders at a given trading floor are only shown quotes input into the system by parties with whom they have credit. The actual credit limits are stored at bank nodes in the EP-A-625275 system. In other words, a market distributor is located at the same location as the trading floor with which each it is associated. The market distributors must communicate with other market distributors in order to update the credit matrix. As can be seen clearly from FIG. 1A, this is done through communication via arbitrators. In practice, the arbitrators, of which there are three globally, are located at the main centres of trade: New York, London and Tokyo. This ensures fair matching at these centres of trade as messages related to matching need only travel from local traders to their local arbitrator. Otherwise, the latency in electronic messages travelling around the globe can have a detrimental impact on orders being matched. Furthermore, in this arrangement, as the communications between market distributors (of which there are currently 64 globally) regarding the credit matrix is via at least one arbitrator it takes some time for these messages to be transmitted. This increases deal times.

Rather than waiting for the matching engine to match visible orders input into the system, traders can input invisible hit and take orders which are an offer to sell or buy a quote at the price and for the amount of the offer.

Once a deal has been concluded, details of the trade, including the identity of the parties and the price at which the deal was concluded, are distributed to all trading floors. Thus, the system is no longer anonymous once deals have been completed.

As illustrated in FIG. 1B, Reuters' published European patent application No. EP 399 850, EP 407 026, and EP 411 748 discloses another automated matching system for anonymous trading of foreign currencies (or other financial instruments) in which a single host computer 20 maintains a central database consisting of all the trading instruments available for trade, credit information, and the various bids and offers that are present throughout the system. The host computer uses the information in its central database to match active bids and offers (as well as executing any transitory "hit bid" and "take offer" transactions) based on matching criteria which include the gross counterparty credit limit between counterparties to a potential matching transaction, price, and available quantity. The host computer blocks completion of an otherwise eligible matching transaction between a given pair of potential counterparties when the transaction has an associated value in excess of the applicable gross credit limit. In this system, the various client site computers (keystations) merely maintain and display a restricted subset of the information available at the central computer, such as a predetermined number of the best bids and offers, and communicate credit and other transaction oriented information to the single host computer for execution. However, in an attempt to preserve the anonymity of the parties, the client sites do not have access to any credit limits set by their possible counterparties, or even to the identification of any other party to a particular transaction until after a transaction has been completed.

Thus, in this system, confidential counterparty credit limit data is maintained in real time and utilized as part of the trade matching process by a central host computer. As a consequence, each client site has no way to determine, prior to committing to buy or sell at a displayed price from one or more anonymous counterparties, whether it is in fact eligible to respond to any of the bids or offers currently being displayed. The client site is connected to the central host computer by telecommunication lines; the host computer is not under the direct control of the party providing the confidential credit limit data and thus provides potential opportunities for unauthorized access to the credit information, even though the host computer does not utilize the credit information until a match has been found between a Buyer and a Seller.

Consequently, unless he attempts to execute a trade at the best price currently displayed on his screen, a trader using the prior art Reuters anonymous matching system has no way of knowing whether he has credit with, and is willing to extend credit to, the anonymous counterparty offering (bidding) the best price currently displayed on his screen and thus whether any attempt to buy or sell at the displayed price will be subsequently invalidated by the system for lack of such credit.

These systems have been most useful for trading regular amounts of an instrument. However, they are not ideal for trading large amounts outside the regular trading range. If one considers the example of FX Spot a typical deal amount is between $1M and $5M ($1 to 5 million). If a bank needs to trade a large amount, for example $50M, it is very unlikely to find a single party willing to trade the whole amount. Instead, a number of separate trades, each probably in the range of $1M to $5M will be concluded. While this order is being filled, the traders' screen will show details of the deals so far concluded. They will see a string of deals all showing the party with the $50M quote on the same side of the deal. The market will conclude that there is a party who needs to buy or sell a large amount of currency and adjust their prices accordingly to the detriment of the party with the large amount to buy or sell.

There is a need for a system which facilitates the trading of large amounts without impacting on the market. This may be without being restricted to a specified time throughout the trading day.

There is also a need for a system that reduces communication between bank nodes in the trading system arrangement described in EP-A-625275 as this increases deal times and there is a desire to decrease them. Aspects of the present invention aim to address this technical problem.

BRIEF SUMMARY OF THE INVENTION

In one aspect of the present invention, there is provided a computerised method of trading a fungible instrument, the method comprising: receiving orders from traders for a fungible instrument, the orders each comprising an amount of the fungible instrument to buy or sell, but no price; matching the orders; and fixing the price of matched orders at a price based on an outside source at a predetermined time.

Advantageously, this method facilitates the trading of large amounts of an instrument without impacting on the market.

Preferably, the outside source is a source of prices not provided by the trading system or from traders trading on the trading system. Preferably, orders on the system are pre-screened for credit with prospective counterparties on the system.

In one embodiment, the price is fixed at periodic intervals. The periodic intervals may be throughout a trading day, preferably two intervals throughout a trading day per outside source. Different outside sources may be used for fixing the price. Each outside source may be fixed once, twice or more per trading day. For example, between once and ten times per trading day. Traders trading on the system may include the time of the price fixing when an outside source fixes the price at more than one interval throughout the trading day. The traders order may also include the outside source that they wish to use for the price fixing.

Preferably, an indication is given to a trader when a deadline for receiving orders is near. Preferably, an indication is given to a trader at a deadline for receiving orders.

In one embodiment, the price of matched orders is fixed at the same time orders are matched. Advantageously, this facilitates the trading of large amounts without impacting on the market and without being restricted to specified time throughout the trading day. In this embodiment, traders do not specify the time of the price fixing in their order, as the order is always executed immediately.

Preferably, after a price of a matched order has been fixed, a trader triggers the release of a deal ticket reflecting the executed order.

Preferably, a deal ticket is issued for each matched order. Preferably, the deal ticket for each matched order is issued, at the latest, at the end of a trading day. Advantageously, this arrangement provides a complete audit trail.

A trader may enter orders to buy and sell the same fungible instrument. This arrangement allows traders to find out market sentiment.

In another aspect of the present invention, there is provided computerised trading system, the computerised trading system comprising: one or more computers arranged on a network, the one or more computers being arranged to: receive orders from parties for a fungible instrument, the orders each comprising an amount of the fungible instrument to buy or sell, but no price; match the orders; and fix the price of matched orders at a price based on an outside source at a predetermined time In a further aspect of the present invention there is provided, a computerised trading system, the computerised trading system comprising: a plurality of arbitrator computers configured to match orders between counterparties in the system, each order comprising an amount of a fungible instrument to buy or sell; wherein a credit manager computer is associated with each arbitrator computer, each credit manager computer being configured to determine whether a predetermined level of credit is available between counterparties before orders between counterparties are matched.

Advantageously, each arbitrator has a different credit manager associated with it.

In one embodiment, the predetermined level of credit available between counterparties is based on the fungible instrument being traded between counterparties. In another embodiment, the predetermined level of credit available between counterparties is based on the institutions of which the counterparties are a part.

Preferably, each arbitrator computer and associated credit manager computer is located at substantially the same location. Each arbitrator computer and associated credit manager computer may be located in the same building. Each arbitrator computer and associated credit manager computer may be located in the same city. Each arbitrator computer and associated credit manager computer may be located in the same country. Advantageously, these arrangement provide low deal times.

Preferably, the computerised trading system further comprises a plurality of market access node computers, each market access node computer being associated with a trading floor and being configured to store credit limits for the trading floor with which it is associated.

Preferably, the market access node computers are located remote from the arbitrator computers and credit managers.

Preferably, the orders at each arbitrator are from traders in a region in which the arbitrator is located.

According to another aspect of the invention, there is provided a computerised method of trading a fungible instrument, the method comprising: a plurality of arbitrator computers each matching orders between counterparties in the system, each order comprising an amount of a fungible instrument to buy or sell; and a credit manager computer associated with each arbitrator computer determining whether a predetermined level of credit is available between counterparties before orders between counterparties are matched.

BRIEF DESCRIPTION OF THE SEVERAL VIEWS OF THE DRAWINGS

Embodiments of the invention will now be described, by way of example, and with reference to the accompanying drawings, in which:

FIG. 16 is a portion of a trader's computer screen display to illustrate an example embodiment of the present invention;

FIG. 17 is a table to illustrate an example embodiment of the present invention;

FIG. 21B is a schematic diagram of an embodiment of the present invention;

DETAILED DESCRIPTION OF THE INVENTION

Figure 1A:
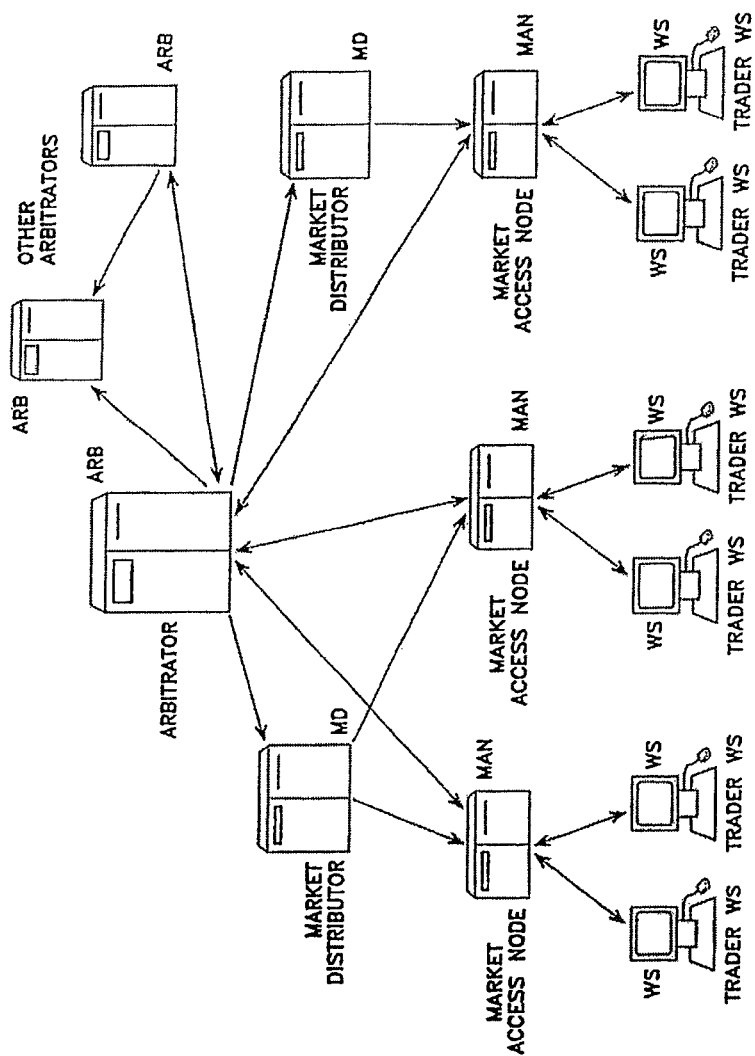
FIG. 1A is a schematic diagram of a known computerised trading system.
Figure 1B:
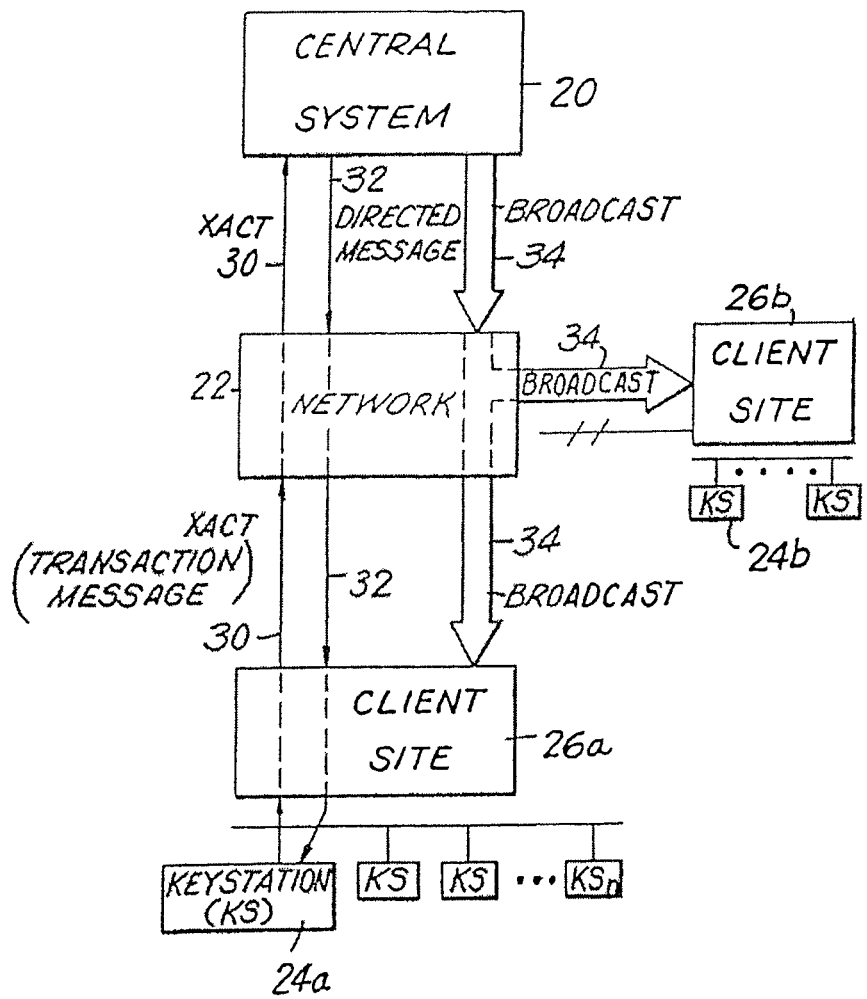
FIG. 1B is a schematic diagram of another known computerised trading system.
Figures 2, 3:
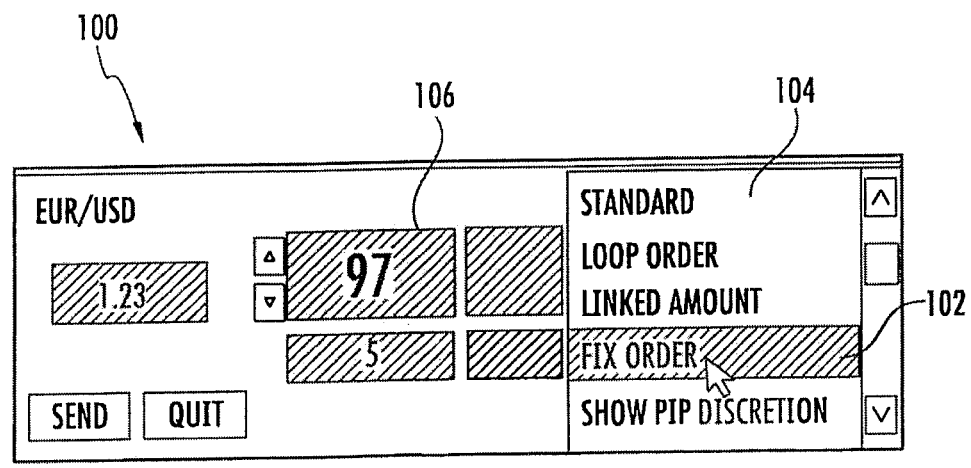
FIG. 2 is a time line to illustrate an example embodiment of the present invention.
FIGS. 3 to 14 are portions of a trader's computer screen display to illustrate example embodiments of the present invention.

Referring to FIG. 2 onwards, on the computerised system embodying the invention, orders are received from parties for a fungible instrument. The orders each comprise an amount of the fungible instrument to buy or sell, but no price. Orders are matched at a price based on an outside source at the time the orders are matched. Orders are submitted into the system rather than quotes. A quote requires both a price and a quantity (amount). Two different variations of the system are described: the so-called fix order system and the continuous matching system.

In the fix order system, the price of an order is set by an outside source at a predetermined time in the future and is then applied to the matched trades. Orders are matched and the price is set at the predetermined time. In the continuous matching system, in contrast, a price is placed immediately or as soon as offsetting orders are matched. There is no wait to fix the price until the designated fixing time. Although there may by a very short wait, based on how quickly the prices from the outside stream of prices is updated. This may be of the order of seconds or fractions of seconds. In both fix orders and continuous matching, orders are entered into a dark pool, that is to say where liquidity in the market is not displayed in order books. Prices are not set by the traders trading on the trading system.

Fixing Orders provide traders the capability to enter buy/sell customer orders that are to be executed at the 'Fix Rate'. Fix orders are matched 'off-screen', once an offsetting amount is detected. These amounts will be matched and locked and completed once the fixing rate has been determined. The rate will be applied to the ticket at or directly after the 'fixing time'. This arrangement has the advantage that it captures the fixing trades currently executed by the voice broker market by providing traders the ability to match off-setting interest anonymously.

The price or rates to be used are typically an indicative rate of prices currently in the market, such as EBS Smoothed Rates or mid-rates derived from a Reuters feed. The price used is, preferably, the mid-rate between the buy and sell rates of the feed.

The fix order and continuous matching arrangements may be implemented, by way of example, on either of the known computer systems described above: the distributed architecture of EP 625275 or the centralised architecture of EP 399850, EP 407026, and EP 411748. An alternative architecture using a computerised credit manager is described further below. The credit manager has a credit administrative information function. The architecture is a variation of the architecture of the distributed architecture of EP 625275 and includes a credit manager, at or associated with, each arbitrator. The credit manager stores credit information between traders. That is to say, credit information is stored away from bank nodes. This arrangement reduces the distance credit messages must travel, thus reducing latency in the system. As a result, deal times are reduced. This is discussed in more detail below.

Fix Orders

In Fix orders, buying interests and selling interests are submitted to an anonymous trading system with an amount, but no price. The orders are matched based on time in the market. The price is set by an outside source at a predetermined future time and is then applied to the matched trades. Each fix order contains a specified set of currency pairs and a range of time during which orders can be submitted. Preferably, there will be multiple fixes available each trading day.

A fix order may be submitted by a trader on a computer trading terminal or workstation. The order may then be matched by the arbitrator (such as that of EP 625275 described above), in segments, where credit exists between counterparties (the parties are pre-screened for credit between them) or, in other words, there is bilateral credit. At the close of trade, the unmatched portion of the fix order is cancelled by the trading system. Shortly after fix time, when the price of the matched order is fixed, a fix rate or price will be sent by a news and rates manager (NRM) to the trading system for each currency pair contained in the fix. The trading system applies the rates to all trades for each currency pair in the fix. Deal tickets are generated for each of the trades.

A fix order is assigned a two character order type, "FX". They have a defined and configurable set of currency pairs that can be traded between the time trading opens (when order submission begins) and the time it closes (when no further orders can be submitted). For example, as illustrated in FIG. 2, trading for the WM fix begins at 09:58:30. Trading for the ECB fix begins at 12:13:30. Trading for the WM fix ceases at 10:58:30. Trading for ECB Fix ceases at 13:13:30. The time between when trading begins and ceases is the trade period.

Below are the actions performed by the trading system at the events on the timeline of FIG. 2.

At trade open time, the quote panel 100 of FIG. 3 on the computer display of a computer trading terminal is such that the order type of Fix Order 102 is activated (no longer grayed out) and a trader can select the Fix Order on the drop-down menu 104. If the currency pair currently selected by the trader is not available for a fix order then the order type of Fix Order remains deactivated (grayed out). The Fix Order option may also be disabled by a trader, in which case it will also be grayed out. The enabling of Fix Order order type is agnostic of the day of the week. In the quote panel, towards the centre of the display, shown enlarged, is the present bid 106 for inputting into the market. Fix Order on the dropdown menu shall not be displayed if the trader's floor is a professional trading community (PTC) trading floor.

The enlarged number 106, here 97, is only the least significant digits of the price, known as the pips. Of course, for a Fix Order prices are not entered, but only amounts.

Figure 4:
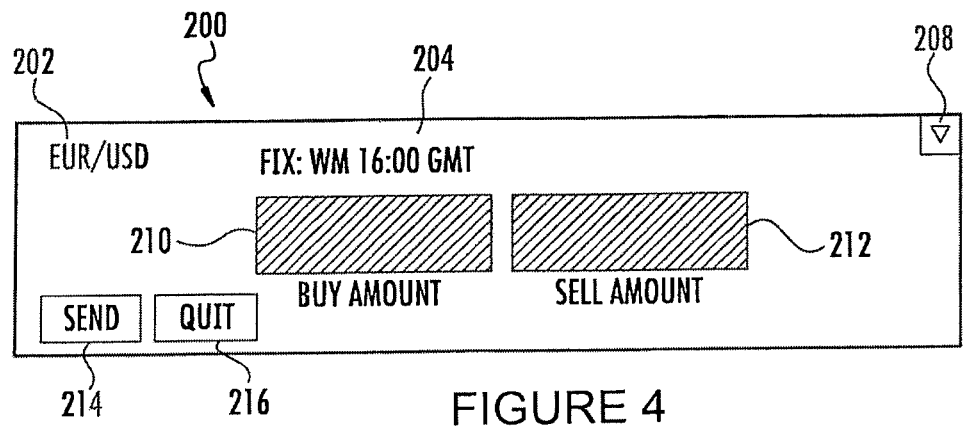

Hence, when the Fix Order type is selected in the drop down menu of FIG. 3 a panel is displayed, called the Fix Order Request Panel 200, which is illustrated in FIG. 4.

As shown in FIG. 4, the Fix Order Request Panel 200 on a display of a trader's computer terminal includes the currency pair 202 for the Fix Order in the upper left corner. The current Fix Offering 204, that is to say the price source and the time (Fix Time) at which the price is to be fixed, is displayed at the top center of the panel, after the words "Fix:". In this example, the source of the Fix is "WM", and the Fix Time is 16:00 GMT (Greenwich Mean Time). If there is more than one Fix Offering available at the current time, then the display allows a trader to select for which offering he wishes to enter an order. This is done using the Order Panel 200' shown in FIG. 5. In this panel, "Select Fix . . . " 204' appears in the location of the current Fix Offering at the top center of the panel. To the right of the words "Select Fix", is a downwardly pointing arrow 206. By clicking or selecting this arrow, the various Fix Offerings will be presented in a drop down menu (not shown). This field is non-editable.

The drop down icon 208 in the upper right hand corner of the Fix Order Request Panel has the same functionality as the equivalent icon (obscured) in the Quote Panel of FIG. 3, so that the order type being entered can be changed by selecting the desired order type such as in the drop down menu of FIG. 3. The drop down in the right upper corner, when selected, displays a list of order types. If the trader selects a new order type (non-Fix), then the Quote Panel for the selected order type is displayed.

In the middle of the panel of the Fix Order Request Panel of FIG. 4, are buy amount 210 and sell amount 212 fields in black boxes. They are blank filled (in FIG. 4), that is to say, they are not displaying any buy or sell amount. The buy amount is the left hand box and the sell amount is the right hand box. A trader enters the amount to be bought or sold in the Fix Order in the appropriate box. In this example, the maximum Fix Buy and Fix Sell Amounts that can be entered for an order are 999. The minimum trade size for an order is the Spot minimum trade size, i.e. one million for Spot currency pairs. The increments of the Buy and Sell amounts are the standard increment for the currency pair. In the Fix Order Request Panel of FIG. 5, a Buy Amount of 300 has been entered by a trader.

At the bottom left hand side of the Panel is a send button 214 (leftmost position) and a quit button 216. Their functionality is discussed in greater detail below.

If there is only a single Fix offering available at the current time, the initial focus is on the Buy Amount 210 and the Sell Amount 212 is greyed out if the Bid button had been selected in the Price Panel and vice versa. If there is more than one Fix offering available at the current time (Fix Order Request Panel of FIG. 5 displayed), the initial focus is on the Fix box 204' at the top center. Once a specific Fix offering is selected by the trader, the focus shifts to either the Buy Amount or the Sell Amount depending upon whether the Bid or Offer button had been selected in the Price Panel.

There is no carryover of amounts or prices from the Fix Order Request Panel to any other panel.

For a single Fix offering (Fix Order Request panel of FIG. 4), if the Bid button had been selected in the Price Panel, the tabbing sequence for the Fix Order Request Panel is "Buy Amount" 210, "Send" 214, "Quit" 216. For a single Fix offering, if the Offer button had been selected in the Price Panel, the tabbing sequence for the Fix Order Request Panel is "Sell Amount" 212, "Send" 214, "Quit" 216. For multiple Fix offerings (Fix Order Request panel of FIG. 5), the Fix box 204' at the top center is the first in the tabbing sequence, followed by the sequence previously stated for Buy and Sell.

For the next subsequent order for the same currency pair as the previous Fix Order, the format of the Order Request panel reverts to the last non-Fix order type.

Selecting or clicking the "Quit" button 216 closes the Fix Order Request panel 200, 200' and the entered order is not processed. The focus reverts to the Price Panel for the specific currency pair.

If no Buy Amount 210 or Sell Amount 212 is entered in the Fix Order Request panel 200, 200' and the "Send" button 214 is selected, an error message "Trade size can't be blank." is displayed (not shown).

If the Buy Amount 210 is populated, and the trader decides to sell instead of buy, then he must select the Offer button in the Price Panel (not shown) to enable the Sell Amount 212 field in the Fix Order Request Panel 200, 200'. Then, the Buy Amount 210 is cleared by the trading system. The same applies for a sell action changing to a buy action.

If the "Send" button 214 is selected after the Trade Close, an error message "Fix has closed" is displayed (not shown).

For a currency pair, multiple Buy and Sell Fix orders are permitted.

Both Buy and Sell pre-match Fix orders are permitted simultaneously for multiple currency pairs within a Fix. A buyer can enter buy and sell interest at the same time. This allows a trader to see the market sentiment by whether the buy or sell interest (or indeed both) is being hit. This is important because as trading is in a "dark pool", a trader cannot see the order book, and so he cannot see which orders are being hit. In this way, he can see that there is interest in the pool.

Figure 5:
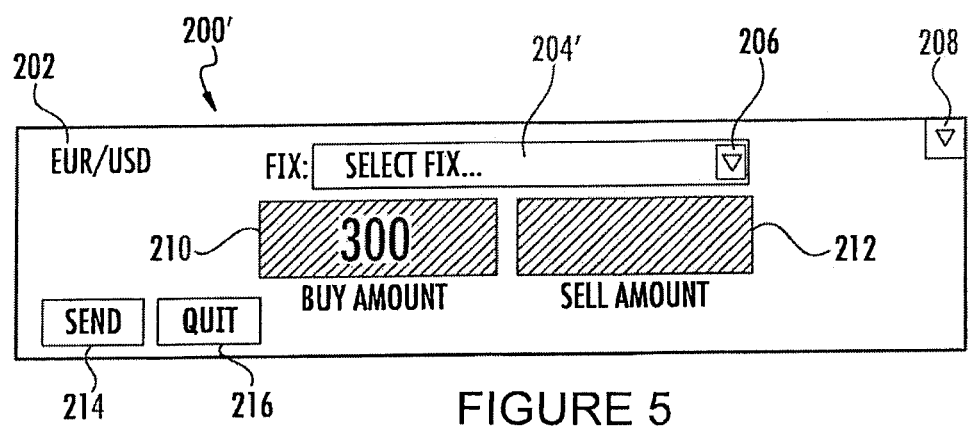
Figure 6:
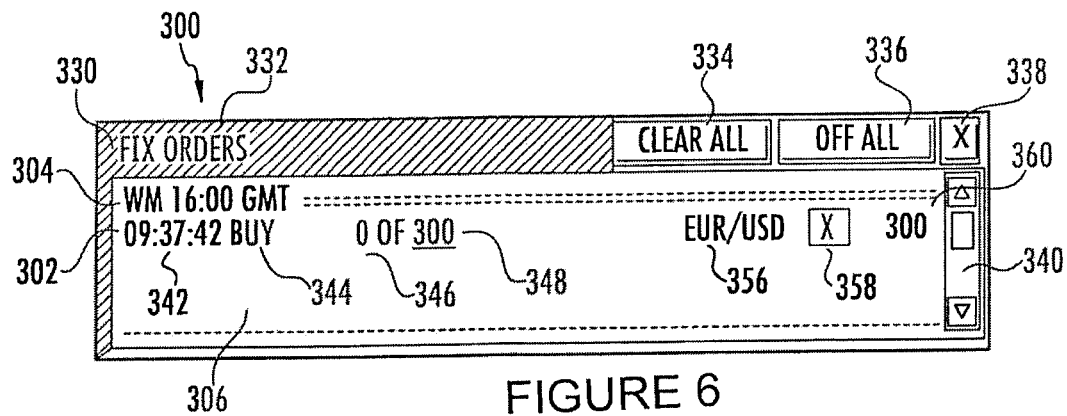

When the "Send" button 214, on the Fix Order Request panel 200, 200' of FIGS. 4 and 5, is selected for the first valid order, the order is transferred to a Fix Order Panel 300 of a display of a trader's computer terminal illustrated in FIG. 6. The entered Fix order 302 is displayed following the Fix header line 304. If the "Send" button 214 is selected in the panel of FIG. 4, the error message described above of "Trade size can't be blank." appears as no trade size has been entered. If the "Send" button 214 is selected in the panel of FIG. 5, the order of the amount is transferred to the Fix Order Panel 300, as a valid amount of 300 has been entered into the Buy Amount box 210. For subsequent orders submitted, they are displayed in the existing Fix Orders panel 300, within the appropriate Fix.

These are the rules for the placement of the Fix Order Panel on a trader's screen or display (not shown).

If in a Screen Setup, an Information Panel has been selected to be overlayed by the Fix Order panel 300, then the Fix Order panel appears when the trader submits the Fix order (if a Fix Order panel is not already displayed). The Fix Order panel overlays the specified Information Panel. The Fix Order panel inherits the height of the overlayed panel. Alternatively, if in the Screen Setup, no Information Panel has been selected to be overlayed by the Fix Order panel, then the Fix Order panel overlays the Fix Order Request panel 200, 200' (such as that of FIG. 5). If a Fix Order panel 300 is already displayed, then the new Fix order adds to the existing Fix Order panel.

The Fix Order panel 300, once it has been displayed is not overlayed by another panel. Similarly, the Information panel selected, in the Screen Setup, to be overlayed by the Fix Order panel, is not overlayed by any panels other than the Fix Order panel.

Figure 7:
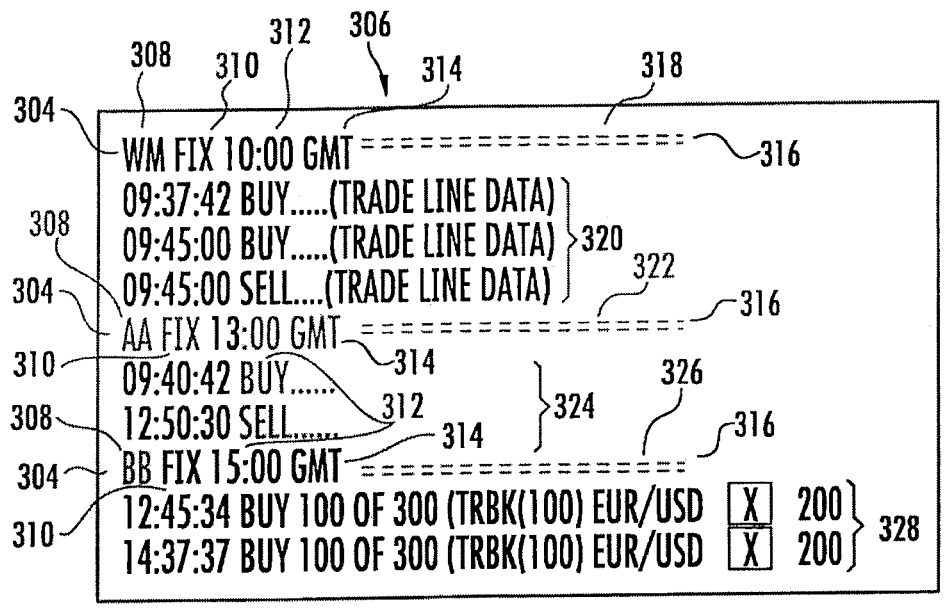

As illustrated in FIG. 7, the body or information window 306 of the Fix Order Panel contains the following:

a fix header line 304 displaying the Fix Source 308 (the source of the price), words reflecting the type of order, namely "Fix" 310, Time (the time of the fix) 312, "GMT" (the time zone being used for the fix) 314, followed by double dashed lines 316, for example: WM Fix 16:00 GMT = = = = = = = = = = = =

The body of the Fix Order Panel also includes Trader's Fix orders and Fix deals. The default sort of the data in the Fix Order Panel is as follows. Oldest Fix header line 318, followed by Fix orders or trades included in the Fix in ascending order of the submit time (new orders added to the bottom) 320. Next oldest Fix header line 322, followed by Fix trades included in the Fix in ascending order of the match time 324. Current Fix header line 326, followed by Fix orders or trades included in the current Fix in ascending order of the submit time 328.

As shown in FIG. 6, the top or header 330 of the Fix Order Panel 300 includes: the name of the panel 332, in this case "Fix Orders" and various buttons: a "Release Tickets" button that is conditionally displayed (this is discussed below, and not shown in FIG. 6), a "Clear All" button 334, an "Off All" button 336, an "X" button 338 at the top right hand corner.

The Fix Order Panel 300 also includes a scroll bar 340 on the right side of the panel, enabling the trader to scroll through rows of Fix orders and trades that cannot be displayed due to space constraints. When the Fix Order Panel 300 is not in focus, as new orders are added, the contents of the panel automatically scroll to display the new orders. When there are overlapping Fixes, that is to say orders can be submitted to more than deal that can later have the price fixed, a new order may be entered against any open Fix. The new order is, of course, displayed within the appropriate Fix.

The "Release Tickets" button is displayed only if the Fix Deal Ticket Option selected by the trading floor administrator (TFA) is a trader initiated ticket release. When a trader clicks the "Release Tickets" button, deal tickets are released to the back office for all trades to which the Fix Rate has been applied, and trades that have not yet been released. In other words, after a price has been fixed, a trader triggers the release of a deal ticket reflecting the executed order; it is not released automatically. There is a visual indication that the deal tickets have been released. Manually releasing tickets provides advantages as regards risk management. By allowing tickets to be held, management of bank's automatic hedging systems is improved. By way of example, if the ticket is released automatically and immediately, a bank's automatic hedging systems will also automatically and immediately hedge against the order being settled. However, if an offsetting ticket is soon to be released this hedging is unnecessary. By providing manual ticket release, unnecessary hedging can be prevented, as ticket release can be delayed.

When a trader clicks the "Off All" button 336, the unmatched portion of all orders is interrupted. If there are no unmatched orders, no orders are interrupted.

When a trader clicks the "Clear All" button 334, trade items in the Fix Order Panel are cleared in accordance with the following conditions. If the TFA option is for trader intervention to release deal tickets: clear Fixed trades with released deal tickets and associated Fix Time and Source lines. If the TFA option is for automatic release of deal tickets: clear Fixed trades and unfixed trades and associated Fix Time and Source lines.

When a trader clicks the "X" button 338 at the top right, the Fix Order Panel 300 closes, only if there are no unmatched orders, no unfixed trades, and no fixed trades for which deal tickets need to be manually released. Once the Fix Order Panel has been closed, it is displayed again, only if a Fix order is submitted. The new display of the Fix Order Panel, based on a new order submit, does not contain deal information from prior trading activity.

When the first order is entered for a new Fix, the line with the Fix information 304 is displayed, for example: "WM 10:00 GMT = = = = = = = = = = = = =".

When the Fix Order panel 300 is not in focus, Fix orders are not interrupted when the keypad's "Off All" button or key 336 is selected or clicked. When the Fix Order panel is in focus, Fix orders are interrupted when the keypad's "Off All" key is selected or clicked.

The unmatched portion of all Fix orders is interrupted with a combination of keystrokes that causes a "Super Off All".

Fix orders cannot be rested.

Figure 8:
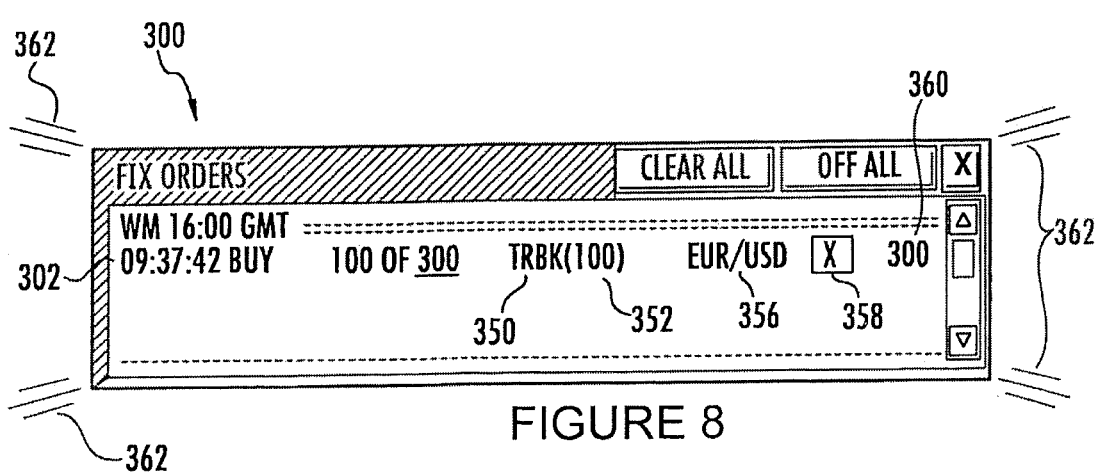
Figure 9:
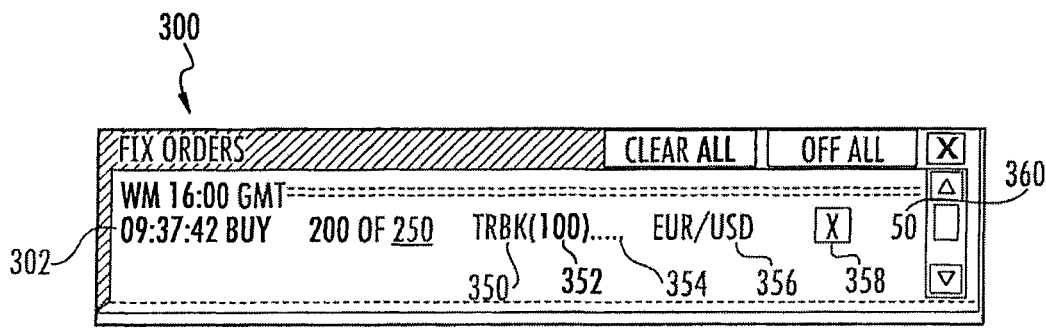

Prior to Trade Close, a single line 302 for each Fix order submitted by a trader is displayed in the Fix Order panel 300. The line includes:

the submit time 342 of the order;

whether the order is a "Buy" or "Sell" order 344;

the matched amount 346 of the total Fix order amount 348 (i.e. "0 of 300" progresses to "100 of 300", "200 of 300", as the order is matched and when the order is fully matched, only the matched amount is displayed, i.e. "300");

while there is no part of the Fix order matched (as shown in FIG. 6), the field to the right of the amounts (counterparty) is blank;

when there is a single match of the Fix order, as shown in FIG. 8 the field to the right of the amounts contains the counterparty deal code 350 followed by the matched amount 352 in parenthesis (in this example 100);

when there are multiple matches for the Fix order, the first counterparty deal code and matched amount is displayed and a visual indicator of multiple matches is displayed (this is shown in FIG. 9, by the ellipsis " . . . " after the counterparty deal code 350 followed by the matched amount 352 in parenthesis);

currency pair 356 for which the order is for;

an "X" button 358 to interrupt the unmatched portion of the order (this button is conditionally displayed; it is displayed only if there is an unmatched portion of the order); and the unmatched amount 360 is shown in a particular different colour, in this example, it is red.

There may be multiple Fix orders displayed for the same currency pair within a Fix. And there may be multiple Fix orders for multiple currency pairs within a Fix.

When the trader clicks the "X" button 358 to the right of the currency pair, the unmatched portion of the order is interrupted. The unmatched amount in red 360 is decremented by the amount of the interrupt. Previously matched portions of any order are not interrupted. In this example, this action is supported only by mouse selection; this action cannot be selected using a keypad.

Figure 10:
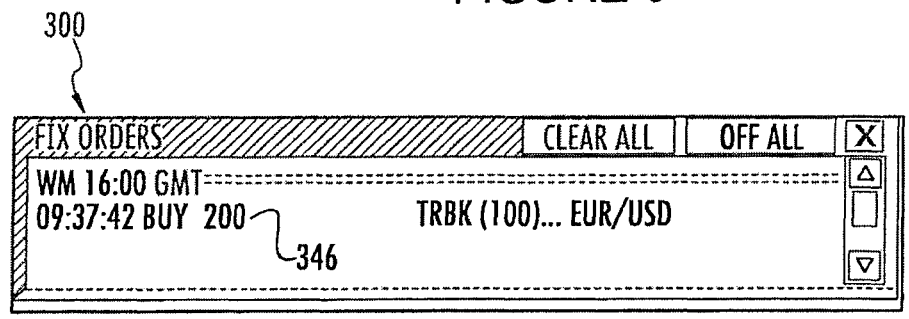

As shown in FIG. 10, when part of the order is interrupted, only the done amount 346 of the order is displayed, i.e. in this example, 200, not 200 of 300.

At Trade Open, the panel background changes color. At Trade Close, the panel background changes color. If displayed, the current Fix Source, Time and dashed lines are displayed in black.

When an amount is matched, there is an alert, and in particular a visual indication is given. In this example, there is a flash of the panel background (as indicated by the dashes 362 at the corners of the panel 300 of FIG. 8).

As shown in FIG. 8, the first time a portion of the Fix order is matched the counterparty deal code 350 is displayed with the trade amount in parenthesis 352.

Figure 11A:
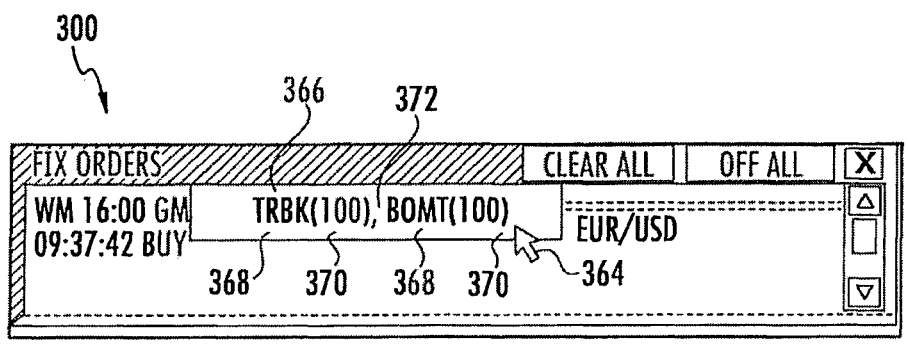

As shown in FIG. 9, when there are multiple matches for a Fix order, the first counterparty deal code 350, with the trade amount in parenthesis, is displayed. A visual indicator (in this example ellipsis 354) is displayed to indicate multiple matches for the Fix order. As illustrated in FIG. 11A, if there are multiple matches, the trader is able to move the mouse pointer 364 over the counterparty displayed and a tool tip 366, or display panel, pops-up with counterparties' information. The tool tip contains each counterparty 368, followed by the trade amount enclosed in parenthesis 370. Each counterparty set is separated by a comma 372. The tool tip is closed (it is no longer displayed) by moving the mouse pointer away from it.

Figures 14, 15:
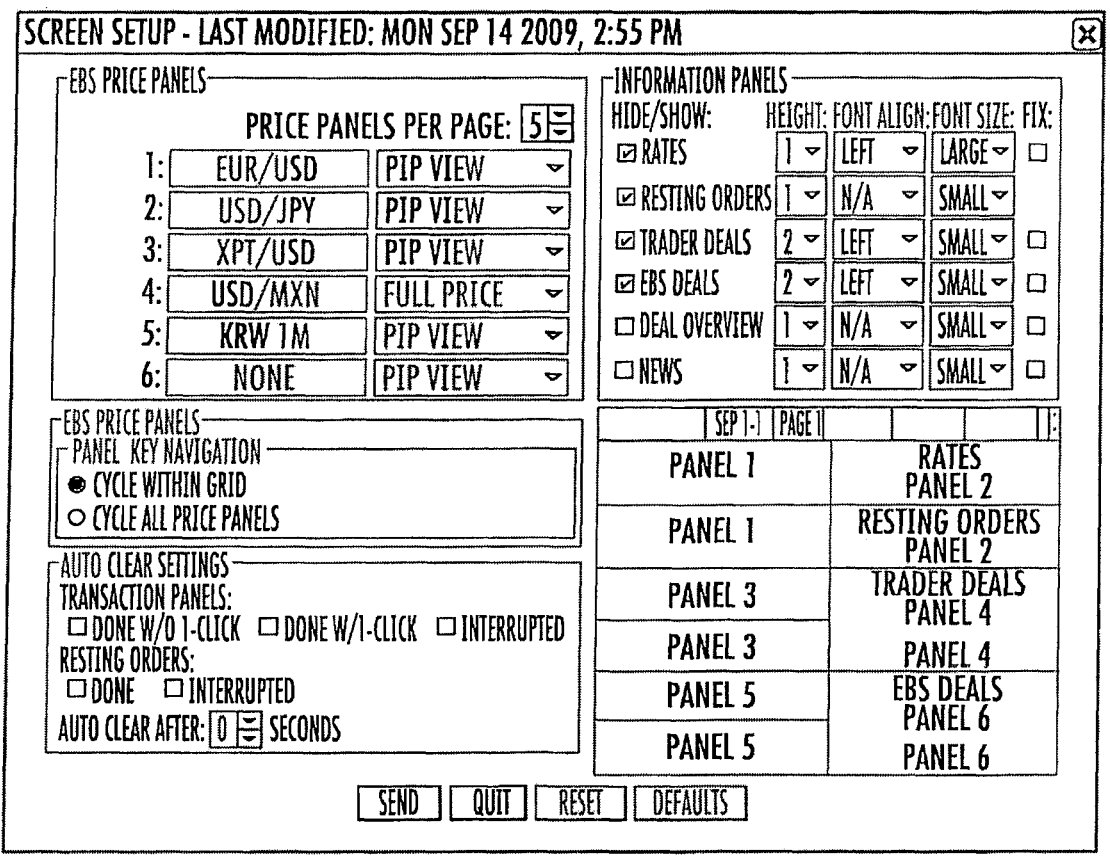
FIG. 15 is a table to illustrate an example embodiment of the present invention.

As illustrated in FIG. 14, as portions of an Fix order are matched, the matched number 346 is incremented by the amount of the match, for example, 200 of 300. As portions of a Fix order are matched, the unmatched amount 360 is decremented by the amount of the match.

As illustrated in FIG. 10, when the Fix order is completely matched, only the matched amount (trade amount) 346 is displayed, i.e. 200. The Fix order will continue to be displayed in the Fix Order Panel 300, but has no more matches applied to it.

Figure 11B:
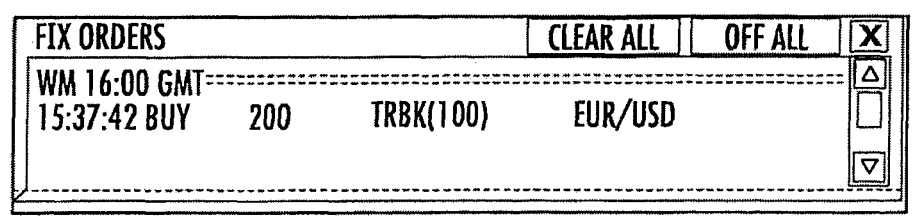

Trade Close warning is a warning given shortly before the Fix is closed to new orders. The trade close warning is typically given two minutes before trade close. In other words, an indication is given to a trader when a deadline for receiving orders is near. Other times are possible, such as between one and five minutes before trade close. At Trade Close Warning, an indication, and in particular a visual indication is given. In this example, the background color of the EBS clock on the title bar of the trading screen (not shown) changes color and/or flashes in the same manner as the Fix Orders panel, for all traders with orders in the Fix that is closing. Also, in this example, at Trade Close Warning, as illustrated in FIG. 11B, the Fix Orders panel 300 background color changes (in this example, from green to yellow) and/or flashes. Also, the panel background color changes. The rest of the panel, for example, the header line with the currency pair selected by the trader and the bid/offer prices in the panel is unchanged.

Figure 12:
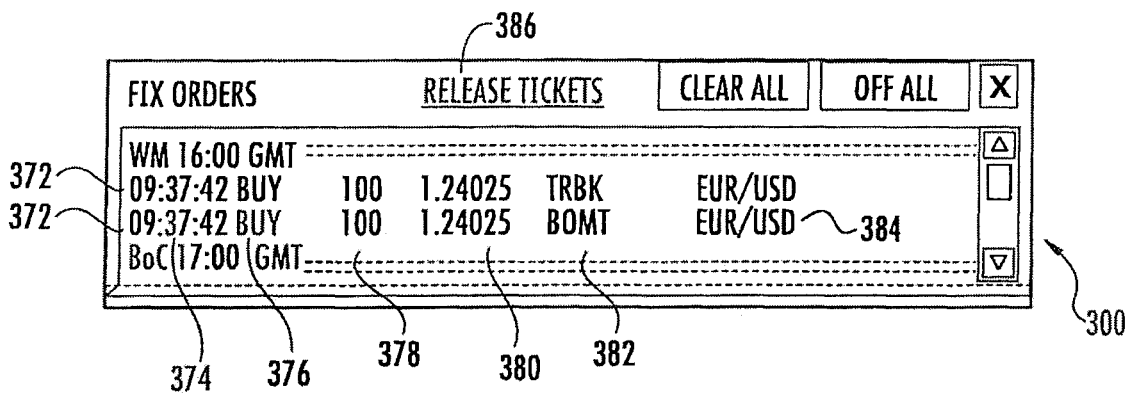

As illustrated in FIG. 12, at Trade Close, the single line for each submitted Fix order is replaced by a line 372 for each trade. So, if an order was matched five times, five trade lines are displayed. The trade line includes: the time of the match 374; whether the matched order was a "buy" or "sell" order 376; the amount of the trade 378; the price of the trade 380, the trading floor 382; and the currency pair 384.

Figure 11C:
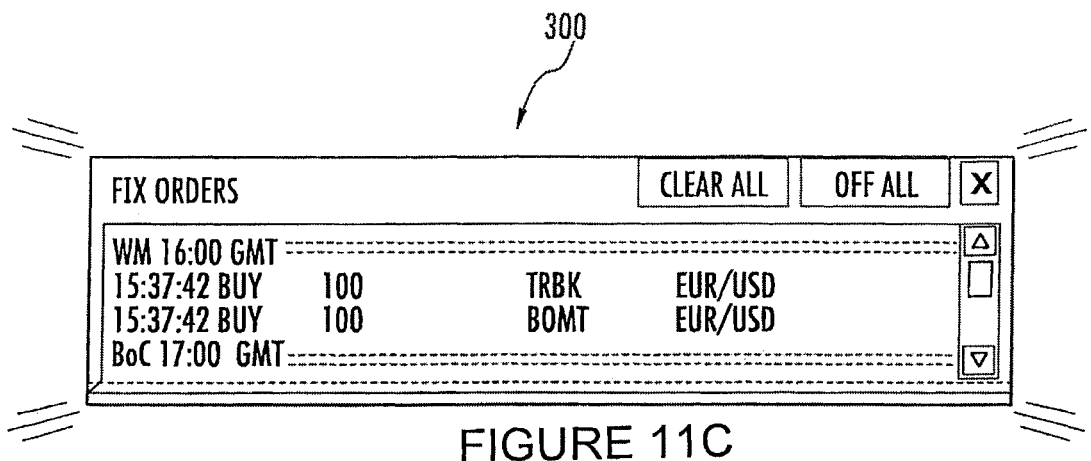

At Trade Close, an indication, and in particular a visual indication is given. In other words, an indication is given to a trader at a deadline for receiving orders. In this example, the background color of the EBS clock on the title bar of the trading screen (not shown) changes color and/or flashes in the same manner as the Fix Orders panel, for all traders with orders in the Fix that is closing. At Trade Close, the Fix Orders panel background color changes (in this example, the color changes to red) and/or flashes (as shown in FIG. 11C). At Trade Close, the trading system cancels the unmatched portion of the Fix orders. If any Fix orders were cancelled, the title bar and the panel background of the Fix Order Panel 300 give an indication, and in particular a visual indication, which in this example is a flash. Trade close typically occurs 90 seconds before the price fix time. Other times are possible, such as between 30 seconds and 5 minutes before the price fix time. Also, at Trade Close, the Fix Order order type 102 is greyed out in the Quote Panel 100 of FIG. 3, so that it can no longer be selected.

When the trading system receives the Fix Rates from NRM, prices are added to the Trade lines. If the rate for the Fix has not been received by the Fix Rate Alert or warning time, then the trading system sends a message to a FX support portal (FSP) (not shown) requesting missing rates for the appropriate currency pairs within the Fix.

Credit calculation for Fix orders is no different from that of any other type of order.

After the Fix rates have been applied to the trades, the rates are displayed visually differentiated from the other information on the trade lines as described above in relation to FIG. 12.

Selecting, for example by double clicking, a Fix trade causes a drop down menu to be displayed (not shown) with two menu items: Deal Ticket Summary and Deal Log. The trader may select either menu item.

Figure 13:
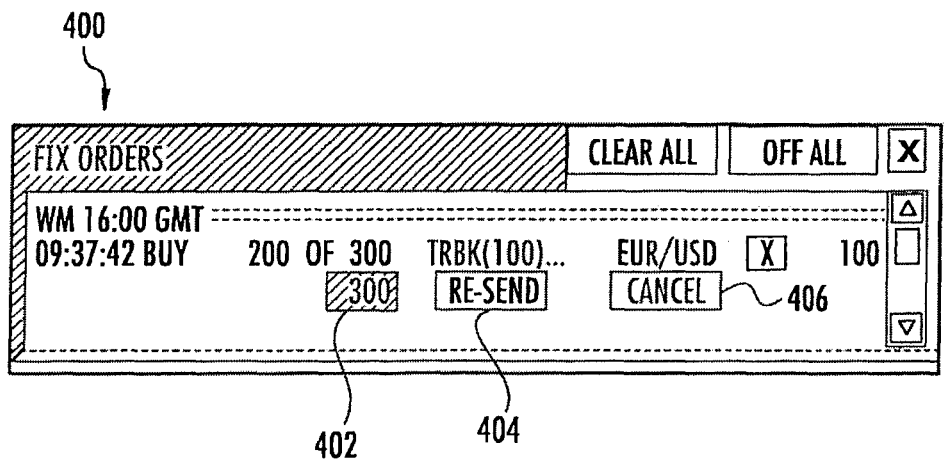

An Amend Fix Orders of the Fix Order Panel 300 is provided. This is illustrated in FIG. 13. Fix orders can be amended to a reduced amount as follows. When a trader sets focus on a Fix order 372 in the Fix Order panel 300 of FIG. 12, either the "SEND" button on a keypad (not shown) or a mouse click, allow the trader to amend the Total Amount of the order as an Amend Fix Orders display panel 400 as shown in FIG. 13 appears. The trader can enter a new (amended) Total Amount by entering it in a box 402 in the Amend Fix Orders of the Fix Order Panel. While the order is in focus to be amended, the Fix order can continue to be matched. The displayed Matched Amount continues to be updated, if required.

Both the Total Amount and the Matched Amount are visible to the trader, i.e 100 of 500. The trader re-sends the amended amounts by selecting a "Re-Send" button 404 or the trader can cancel the transaction by selecting a "Cancel" button 406. This includes only Fix orders that have been zero filled or partially filled. In other words, selecting a "Cancel" button 406 ceases amendment processing. Selecting a keyboard "Resend" button 404 or keypad "Send" key, initiates editing against the new amount entered (Edits are the same as for Spot amendment) with the following criteria. A request to amend the Fix Order amount to the same original amount is ignored;

the Fix Order amount cannot be zero;

the Fix Order amount cannot be increased and if an attempt to do this is made the error text of "Invalid trade amount" or other similar wording is displayed;

the Fix Order amount is equal to or greater than the Minimum Trade Size for the currency pair;

the increment of the Fix Order amount change must be valid for the currency pair; the Fix Order amount must be equal to or less than the original amount;

if the amended amount is equal to or less than the matched amount, the original order is considered "done".

When the keyboard "Resend" button or keypad "Send" key, is selected for a valid order, the Fix Order Panel remains in focus and the unmatched amount and the total Fix order amount are updated. The total Fix order amount is replaced by the amended amount entered by the trader. The unmatched amount is recalculated as follows:

Unmatched Amount=Total Fix order amount−matched amount.

In the Main Trading window (not shown), "Sign Off" is not enabled when: a Fix Order Request panel is active; and the Fix Order panel contains orders, Unfixed trades (Fix Rates have not been applied), or Fixed trades for which deal tickets have not been released.

The trading system includes various administrative screens for configuring a user trader's preferences. A Screen Setup display 500 is shown in FIG. 14.

By selecting appropriate buttons on the display 500, a trader can designate that the Fix Order panel, will overlay an Information Panel which is already selected to be shown. The Resting Order panel can never be able to be selected for overlaying. A trader can only select, at most, one Information panel, at a time, to be overlayed. If a trader chooses to hide (deselects) the Information panel that was designated as the Fix Overlay, the Fix Overlaying is disabled. A trader may choose none of the Information panels to overlay. In that case, the Fix Order panel overlays the Fix Order Request panel. Auto Clear Settings do not apply to the Fix Order Panel.

Parameters are included at the floor level to allow the trading floor administrator (TFA) to determine whether a floor chooses a Single Deal Ticket Option for Fix trades, or Two Deal Ticket Option for Fix Trades. The selected options are effective for all traders on the floor.

For the Single Deal Ticket Option, there are two particular features. The deal ticket can be released to the back office automatically after the Fix rate has been applied. Alternatively, the deal ticket is manually released when the trader initiates it, after the Fix Rate has been applied to the deal. The manual release option is only available to floors using Deal Feed Client. (The option is not available to floors using the Deal Feed Alternative via the TFA.)

For the Two Deal Ticket Option, there are also two particular features. They concern the release of the final deal ticket. The first ticket is automatically released to the back office at match time. The final deal ticket is automatically released after the Fix rate has been applied. Alternatively, the deal ticket is released when the trader initiates it, after the Fix Rate has been applied to the deal. The manual release option is only available to floors using Deal Feed Client. (The option will not be available to floors using the Deal Feed Alternative.)

The default is a single deal ticket with automatic release of the deal ticket.

Changes made by the TFA are effective with the next sign on for the trader.

Prime Banks are not allowed to choose the manual release of deal tickets.

At start up of the trading system, the trading system obtains a list of floors. The floors are noted, as either Bank or PTC (non-Bank). If the list of floors is not available from FSP, the trading system does not come up.

At start up, the trading system obtains the information from FSP for each Fix as shown in the table of FIG. 15. This shows the expected fixing administrative information from FSP. No data structure is implied in the table.

The trading system converts the Fix Time to GMT using the Fix Source Local Time and the Fix Source Local Time Zone. The trading system calculates the following times based on Fix Time in GMT:

Trade Open=Fix Time−Trade Open

Trade Close Warning=Fix Time−Trade Close Warning

Trade Close=Fix Time−Trade Close

The trading system adds a date to the Fix Time received from FSP, to provide uniqueness among days. The trading system converts the Local time to GMT and the GMT is used for all displays of the Fix Time. Fixing periods may overlap.

From NRM, the trading system requests fix rates for Fixes that may have occurred while the trading system was not available.

At Trader Logon, the trading system queries for orders and trades to be displayed in the Fix Order Panel as follows. All unfixed trades and their associated Fix Time and Source lines are displayed in a Fix Order Panel; Fixed trades that have not been released are displayed; Fixed trades that have been released are not displayed; and of all matched orders that have not been fixed, the trades are displayed.

Unmatched orders are cancelled by the trading system if a trader is ungracefully disconnected.

Post Trade arrangements for deal feed clients (DFC) only are as follows.

As mentioned above, there are two options of deal ticketing. One option is a single deal ticket per counterparty for each trade. A second option is two deal tickets per counterparty for each trade. With the single ticket option, the deal tickets are either released automatically after the Fix rates are applied to the deals or the trader initiates the deal ticket release. With the two ticket option, the deal ticket produced at match time is automatically sent to the back office. The final deal ticket is produced after the Fix Rates has been applied to the deals and is released automatically or the trader initiates the deal ticket release. The deal ticket option is configurable by trading floor.

For the single deal ticket option, there is one deal ticket for each trade. The deal ticket is automatically released to the back office if the automatic release option is selected or the trader releases the deal ticket if the dealer initiated option is selected. The deal ticket is generated and released or available for release to the back office after the Fix Rate is applied to the trade. The rate on the deal ticket is the Fix Rate. The time on the deal ticket is the time of the Fix Rate provided by NRM. Match time is added to the ticket. The Reference Number (deal id or deal identification) has a suffix added to it to indicate that the deal is a Fix deal.

The trader releases the deal tickets for all Fixed trades by selecting the "Release Tickets" button 386 on the Fix Order Panel 300 of FIG. 12. For the two deal ticket option, only the second deal ticket is released when the "Release Tickets" button is selected. The first ticket is automatically released.

For the two deal ticket option, there are two deal tickets for each trade. The first deal ticket is generated at match time and automatically released to the back office. The rate on the first deal ticket is a Smoothed Rate or other indicative rate for the currency pair at the time of the match. The Smoothed Rate is provided by the arbitrator or ARB on the deal message; the Smoothed Rate is applied to the deal by the ARB. The Smoothed Rate is reformatted to the appropriate number of decimal places, conforming with the existing price format. If the rate provided by the ARB is zero, then the trading system also displays zero on the deal ticket. When the rate provided by the ARB is zero, for a Prime deal, there is no spread on the synthetic ticket. The time on the first deal ticket is match time. The Reference Number (deal id or deal identification) has a suffix added to indicate that the deal is a Fix deal. The second Deal Ticket is generated after the Fix Rate is applied to the trade. The second deal ticket has the same deal ticket number as the first deal ticket. The second deal ticket is automatically released to the back office if the automatic release option is selected or the trader releases the deal ticket if the dealer initiated option is selected. The rate on the second deal ticket is the Fixing rate. The time on the second deal ticket is the time of the Fix Rate provided by NRM The Reference Number (deal id or dead identification) has a suffix to indicate that the deal is a Fix deal. The suffix is different to the suffix on the first deal ticket. The suffix appended to the deal id can support combinations of Maker Prime, Taker Prime and Fix. A single deal ticket and the first deal ticket of the Two Deal Ticket option contain the identical suffix value.

If automatic printing of the deal ticket is enabled, and the automatic deal ticket release is selected, the ticket prints after the Fix rate has been applied. If automatic printing of the deal ticket is enabled, and the manual deal ticket release is selected, the ticket prints after the ticket has been released.

Fix trades are to be excluded from Trader Deals, EBS Deals, and (deal) Overview panels. Fix trades are, however, included in the Deal Log.

Settlement dates for Fix trades are calculated in the same manner as Spot trades.

A deal log 600 is shown in FIG. 16. For the purpose of the Deal Log display, whether the trader (floor) has the two deal ticket option or the one deal ticket option is determined by the value of the option at the time of the query, not the value of the option at the time of the deal.

For the two deal ticket option, two rows are displayed. One row for the ticket generated at match time and another row for the ticket generated when the Fix Rate is applied to the deal. Time is the match time on the first deal ticket (Fix rate has not been applied). Time is the time from NRM on the second deal ticket (Fix rate has been applied). Order Type is "FX". Price is the Smoothed Rate (reformatted to proper price format) on the first deal ticket. If the rate provided by the ARB is zero, then the trading system also displays zero on the deal ticket. When the rate provided by the ARB is zero, for a Prime deal, there is no spread on the synthetic ticket. Price is the Fix Rate on the second deal ticket. The Reference Number is the deal id plus the assigned suffix.

Means are provided to sort or filter on Order Type.

For the two deal tickets option, the first deal ticket is excluded from the Maker/Taker counts and EBS Deals 602, displayed at the bottom right of the Deal Log.

Deal Tickets for Fix trades are included in the reports and contain the same data as is reported in the Deal Log.

Deal Ticket Summary is available for Fix deals. It is accessed by the trader clicking on a row in the Deal Log, and the deal ticket associated with that row is displayed.

Deal Ticket Summary can also be accessed by the trader double clicking a trade in the Fix Order panel. If the Fix rates have not been received by the trading system, then the deal ticket will display the reference rate. If the Fix rates have been received by the trading system, then the deal ticket displays the Fix rate.

The Time and Price data are the same as is displayed in the Deal Log. If the deal ticket contains a reference rate (not the Fix rate) then a textual line "Reference rate displayed" is added to the Deal Ticket Summary.

The trading system subscribes to the NRM to receive Fix rates. The trading system expects to receive the rates shortly after the Fix Time of each Fix. The Fixing Rate Information required is detailed in the table of FIG. 17 (no data structure is implied in the table). The table shows the expected fixing rate information from NRM.

A Fix is defined by its source and a Fix Local Time and Fix Date. The Fix Local Time for each Fix is converted to a particular time zone, in this example, GMT (Greenwich Mean Time) by the trading system and displayed as GMT.

Once the trading system receives the Fix Rates for each currency pair in the Fix, as illustrated in FIG. 16, the rate 380 is applied to each applicable trade and displayed in the Fix Order panel 300 for each visible trade.

The same Fix Rates are provided by NRM to each Broker. Each broker updates its deals within its database.

The trading system has a configurable Fix Rate Alert. The Alert contains the amount of time to wait after a "Fix Time" prior to taking action to obtain Fix rates for any currency pairs within a Fix for which deals have been done and rates have not been received. When any expected Fix rates have not been received and the waiting time after the "Fix Time" has expired, if the Broker has remained continuously connected to NRM since the "Fix Time", the Broker sends a notification to FX support portal (FSP) indicating the Fix and the specific currency pairs for which it needs rates.

If the waiting time has expired and the trading system lost connectivity with NRM since the "Fix Time', the Broker requests from NRM, Fix rates for Fixes that may have occurred while the trading system was disconnected. If the NRM has no rates to provide to the Broker, then the Broker sends a notification to FSP indicating the Fix and the specific currency pairs for which it needs rates.

At the end of the trading day, the trading system releases to the back office all deal tickets with Fix Rates that had not been previously released. The end of the trading day is defined as the default end of day (5:00 pm in New York). This requirement is to account for a trader not releasing his deal tickets. This, and providing multiple deal tickets (rather than a single deal ticket), provides a complete order trail at the time match occurred. So, there is a record of a complete trading history. This protects both traders and banks.

At the end of the trading day, the trading system removes Fix Order Panels when all deal tickets for the trades have been released and there are no unmatched orders. If Fix Rates are not received by the Currency Pair at the end of day, the trading system takes no action regarding the deal tickets.

The trading system cancels all unmatched Fix orders if a trader is ungracefully disconnected.

If Fix Rates are to be manually input, they will be input to FSP and FSP will communicate them to NRM. NRM will publish them to the trading system.

The Trade Open for a Fix is not dependent upon the receipt of the Fix Rates for the prior Fix.

Fix orders are available to all traders. There is no requirement to turn on/off Fix orders.

ARB provides a configurable Fix order type flag for Market Data, so market rates feed (MRF) can determine whether or not to include Fix order types in existing calculators or a new calculator.

For matched Fix orders, the second trader is considered the Taker.

Ticket numbers for Fix deals are generated by the Maker and Taker Brokers at time of trade confirmation. No new ticket numbers are generated when the Fixing occurs. Ticket numbers are exchanged between the Brokers using an instruction message.

DSM/DST message to the ARB and subsequently to Netlink will not wait for exchange of ticket numbers. They contain only the ticket number of the side sending the message. Counterparty ticket number is not included on the DSM/DST.

Customers who have the one ticket solution will receive an out-of-order ticket number, since the ticket number was generated at trade time, but not released until after the Fixing. Similarly, customers with the two ticket solution will receive an out-of-order ticket number on the second ticket.

A list of floors designating each floor as a Bank or PTC (non-Bank) is provided.

For the Market Data Daily High Low Trades, the three highest and the three lowest trades are displayed to traders. Although, the source of the data may expand beyond three.

Continuous Matching Orders

Like fixing orders described above, Continuous Matching orders are orders entered into a dark pool. Buying interests and Selling interests are submitted into an anonymous trading system with an amount, but no price. The orders are only matched by the Arbitrator with other Continuous Matching orders, based on time in the market, and where credit exists between counterparties (there is bilateral credit). The price of the deal is set by the Arbitrator at the time of the match, based on pricing from an outside source. The price of matched orders is fixed or set at the same time or immediately after the orders are matched. There may be a very slight delay while the price is set from the outside source as these are only updated periodically, typically between once a second and once a minute.

Continuous Matching orders can be submitted by any Bank trading floor, for any currency pair, as well as metals and NDFs.

Although there is a minimum order amount, a Continuous Matching order may be matched by the Arbitrator for an amount less than the minimum amount, depending upon the inventory availability.

In the trading system, Continuous Matching will be assigned a two character order type, "CM". Continuous Matching is available for all fungible instruments, such as currency pairs (such as EUR/USD), metals and non-deliverable forwards (NDFs).

Continuous Matching does not have a set period of time during which the instruments can be traded. Continuous Matching trades can be made whenever the Broker is available. This is in contrast to Fixing Orders described above in which Fixing Orders are only available at particular times throughout the trading day.

Credit calculation for Continuous Matching orders is no different than for any other type of order.

Figure 18:
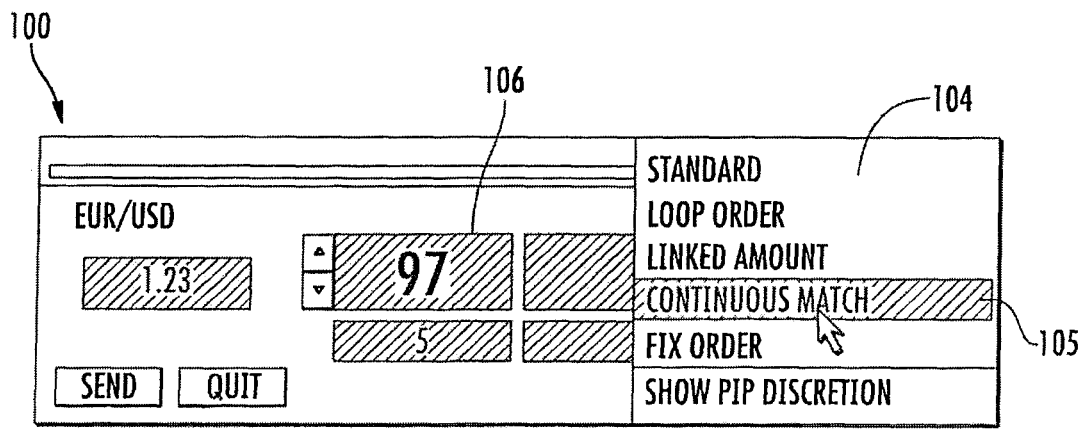
FIGS. 18 to 20 are portions of a trader's computer screen display to illustrate example embodiments of the present invention.

As in fixed orders described above, the order type shall be added to the drop down menu in the Quote Panel 100 of a computer display of a trader's computer terminal so that it can be selected. This is illustrated in FIG. 18, which is similar in most respects to the panel of FIG. 3 and like features have been given like reference numerals, although this also includes the option to Continuous Match. In this example, Continuous Match 105 is shown on the drop down menu 105, and can be selected by clicking on it. Continuous Matching on the dropdown menu is not displayed if the trader's floor is a PTC trading floor.

Figure 19:
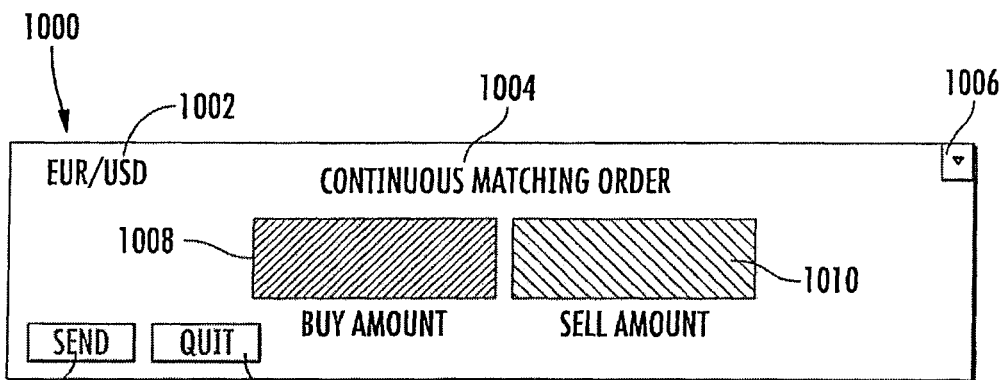

When the trader selects "Continuous Matching" the Continuous Matching Order Request Panel 1000 is displayed in a trader's computer terminal display and this is shown in FIG. 19.

For the next subsequent order for the same currency pair as the previous Continuous Matching Order, the format of the Order Request panel reverts to the last non-Continuous Matching order type.

The Continuous Matching Order Request Panel 1000 displays:

the currency pair 1002 to be traded in the upper left corner; the text "Continuous Matching Order" (or similar) 1004 at the top center of the panel; Drop down icon in upper right corner 1006; Buy Amount 1008 and Sell Amount fields 1010, blank filled; a "Send" Button 1012; and a "Quit" Button 1014.

The initial focus is on the Buy Amount 1008 (which is located to the left of the Sell Amount 1010), and the Sell Amount is greyed out, if the Bid button had been selected in the Price Panel. Alternatively, the initial focus is on the Sell Amount, and the Buy Amount is greyed out, if the Offer button had been selected in the Price Panel.

The drop down 1006 in the right upper corner, when selected, displays a list of order types (it is the drop down menu 104 of FIG. 18). If the trader selects a new order type (non-Continuous Matching) from this drop down menu, then the Quote Panel for the selected order type is displayed. There is no carryover of amounts or prices from the Continuous Matching Order Request Panel to any other panel.

If the Bid button had been selected in the Price Panel, the tabbing sequence for the Continuous Matching Order Request Panel is "Buy Amount", "Send", "Quit". Alternatively, if the Offer button had been selected in the Price Panel, the tabbing sequence for the Continuous Matching Order Request Panel is "Sell Amount", "Send", "Quit.

Selecting the "Quit" button 1014 closes the Continuous Matching Order Request panel and the order in the panel is not processed. The focus then reverts to the Price Panel for the specific currency pair.

If no Buy Amount or Sell Amount is entered in the Continuous Matching Order Request panel 1000 and the "Send" button 1012 is selected, an error message "Trade size can't be blank." (not shown) is displayed.

If the Buy Amount is populated, and the trader decides to sell instead of buy, then he must select the Offer button in the Price Panel to enable the Sell Amount field in the Continuous Matching Order Request Panel. The Buy Amount is then cleared by the trading system. The process is vice versa for a sell action changing to a buy action.

Both Buy and Sell pre-match Continuous Matching orders are not permitted simultaneously for a currency pair. If a trader has an existing Buy Continuous Matching order and a Continuous Matching Sell Amount is entered for the same currency pair, an error message "Continuous Matching Buy order exists" is displayed (not shown). Similarly, if the trader has an existing Sell Continuous Matching order and a Continuous Matching Buy Amount is entered for the same currency pair, an error message "Continuous Matching Sell order exists" is displayed. However, for a currency pair, multiple Buy Continuous Matching orders and multiple Sell Continuous Matching orders are permitted.

The maximum Continuous Matching Buy and Continuous Matching Sell Amount that can be entered for an order is set to a predetermined value, for example 999. If less than the minimum Continuous Matching order amount is entered in the Buy or Sell Amount, the existing error message for this condition is returned to the Trader. The minimum order amount may be included in the error text.

Most importantly, however, no price is submitted on the order. Only an amount is entered into the buy amount 1008 or sell amount 1010 order entry boxes of FIG. 19.

Figure 20:
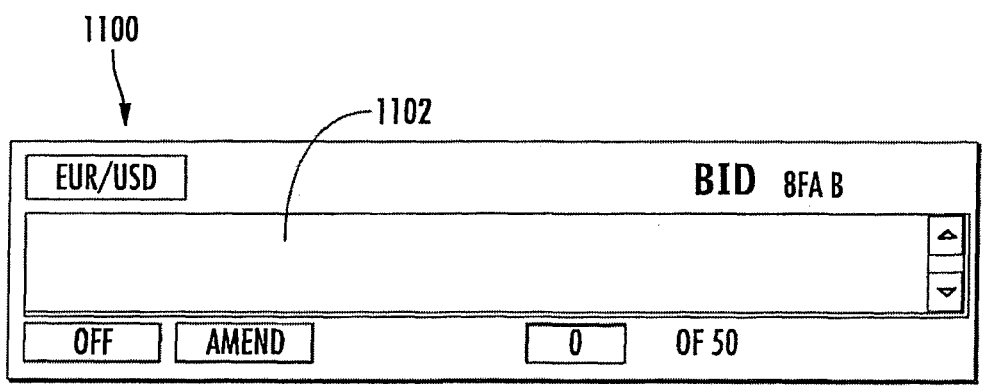

Once a buy amount or sell amount has been entered by a trader and the "Send" button 1012 of FIG. 19 is selected on the Continuous Matching Order Request panel 1000, the order is transferred to a "standard" transaction panel or a Continuous Matching Order Transaction Panel 1100 of a trader's computer terminal display illustrated in FIG. 20.

The transaction panel 1100 has neither a thumb tack nor a resting order widget. No price information is displayed. There are no unique rules for the placement of the transaction panel for the Continuous Matching orders.

As portions of the order are hit, the banner 1102 (which is typically coloured yellow) includes the cumulative amount of the hit and the weighted average dealt price.

In this example, Continuous Matching orders cannot be amended, upward or downward via the transaction panel. All amendments must be no less than the minimum Continuous Matching order amount.

Traders who already have an Order in the order book at a given price to increase the order size without losing priority for existing order segments or decrease order size beginning from the order segment with the lowest priority (LiFo) apply to Continuous Matching orders.

After the trader changes the amount and selects the "Resend" button or keypad "Send" key (not shown), the entered amount is validated. For edits, the Continuous Matching Order amount must be equal to or greater than the Continuous Matching Minimum Order size for the currency pair. The unmatched portion of all Continuous Matching orders is interrupted with "Off all" and "Super Off All" keystroke combinations.

Continuous Matching orders cannot be rested or thumb tacked.

If credit is not enabled, a deal is legally binding when recorded in the Taker database. If credit is enabled, a deal is legally binding when recorded in either Taker or Maker database.

At start up, the trading system obtains the minimum Continuous Matching order size for each currency pair from FSP. If an order size is not available for any active currency pair, the trading system does not come up. At start up, the trading system obtains a list of floors. The floors are noted as either Bank or PTC (non-Bank).

If the list of floors is not available from FSP, the trading system does not come up.

Continuous Matching deals appear in the Trader Deals, Deal Overview panels, Deal Log, and DTS, but do not appear in EBS Deals panel. Trader Deals and Deal Log display "CM" as the order type designation for Continuous Matching orders.

Post trade, as with any spot deal, a single deal ticket is generated and automatically released to the back office at match time. The price to be applied to the deal and thus the deal ticket is provided by the ARB (arbitrator) and communicated to the Broker. If the rate provided by the ARB is zero, then the trading system displays zero on the deal ticket. The zero rate is included in Deal Status messages.

Deal Tickets for Continuous Matching trades are included in reports and contain the same data as is reported in the Deal Log.

A minimum configurable Continuous Matching order size is established globally for each currency pair. The configurable values is set in FSP and provided to the trading system. The list of Bank floors with their characteristics, such as Bank or non-Bank is established and maintained by in FSP and provided to the trading system.

No specific "minimum quote life" (MQL) (actually minimum order life, as the orders in the system do not have a price) requirements for Continuous Matching Orders are applied at the Broker.

Credit Manager

As discussed, Credit management and credit decision making is available at the Credit application rather than the Broker. The credit application is located at the arbitrators. However, TFA maintenance of credit may remain in the Broker and be communicated to the Credit Manager. Credit reporting may remain in the Broker. Credit decisions are made by the Credit application for all trading except trading between Prime Broker (PB) and Prime Customer (PC). Credit between PB and PC will continue to be determined by the Broker.

Figure 21A:
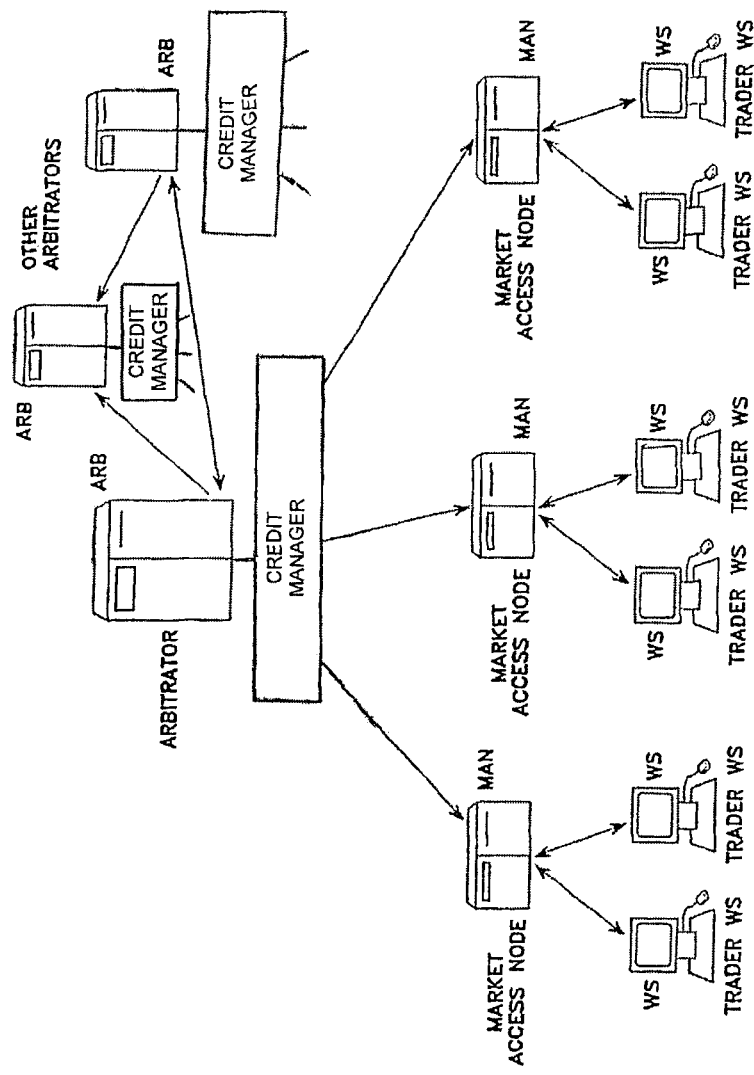
FIG. 21A is a schematic diagram of a system embodying the present invention.

The architecture of the anonymous computerised trading system is illustrated in FIG. 21A. It is similar in many respects to that of the prior art system of EP-A-625275 described above. In summary, it includes a plurality of arbitrator computers configured to match orders between counterparties in the system. Each order comprises an amount of a fungible instrument to buy or sell, but no price. A credit manager computer is associated with each arbitrator computer. Each credit manager computer is configured to determine whether a predetermined level of credit is available between counterparties (bilateral credit) before orders between counterparties are matched. The orders are matched based on a price from an outside price stream. They are not matched at prices on the trading system.

As mentioned above, the trading system includes a credit manager associated with each arbitrator. So, there are a plurality of credit managers. The components illustrated in FIG. 21A, namely the arbitrators, the market access node and trader workstations are each a computer or computers arranged on network. These components are connected together on a computer network. The credit manager may be implemented on the same computer as the arbitrator or the credit manager may be implemented on a separate computer or computers on a network to the arbitrator.

Each credit manager may be located at the same site as each arbitrator or located nearby, such as in the same city (New York, Tokyo, or London) or in the vicinity of the arbitrator. The credit manager stores and maintains a preauthorization credit matrix, like that of EP-A-625275, which is illustrated in FIG. 21B.

The rows and columns of the matrix of FIG. 21B are associated with the various Trading Floors A1$a$, A1$b$, A2$a$, etc. The credit manager stores the credit matrix. Preferably, each credit manager associated with each arbitrator only maintains a partial Preauthorization Matrix containing data only regarding credit extended between trading floors in its locality and other trading floors in its and other localities. Thus, as indicated in FIG. 21B by cross hatching, some of the matrix entries may be blank. For each ordered pair of Trading Floors {TFi,TFj}, the credit matrix contains an indication as to whether TFi has extended any credit to TFj. In the depicted example, credit exists on a bilateral basis between TFA1 and TFA2, no credit exists between TFA1 and TFB1, and credit has been extended unilaterally from TFA2 to TFB1, but not vice versa (as indicated by the "1" at the intersection of row TFB1 with column TFA2 and the "0" at the corresponding intersection of column TFB1 with row TFA2). From the main diagonal of the matrix it can be seen that only TFA2 permits its own traders to trade between themselves, as indicated by the "1" at the intersection of row TFA2 with column TFA2.

While credit availability between trading floors has been described, the system using a credit manager allows credit to be assigned based on factors other than trading floor or deal code, such as the financial instrument or fungible instrument being traded between the parties (for example, particular currency pairs for FX trading, non-deliverable forwards (NDFs), or metals). This approach also allows the credit matrix to reflect credit available between institutions (rather than just particular trading floors of institutions).

Orders are matched by arbitrators using a price set from an outside price stream. Preferably, the arbitrator in the region of the traders being matched is used.

No market view is provided to traders to show them particular prices available to them in the market based on credit they have with prospective counterparties. This is because they do not see prices available to them. Orders entered into the system, do not include a price, but only an amount. Orders are entered into a dark pool.

The arbitrators are in communication connection with market access nodes or brokers. The market access nodes are each under the control of a trading floor administrator (TFA). They maintain confidential records including transaction records and credit limits between prospective counterparties.

Trader workstations or computer terminals where orders are input into the trading system by traders are in communication connection with the market access node associated with the trading floor of the trader.

In the example given, the implementation of this credit approach is done at the floor level. For a period of time, trading can transact between a floor using this credit approach and a floor using the known credit approach (of EP-A-625275). For the most part, while there is a mixed mode of credit between the two trading floors, the existing deal processing takes precedence. Known deal processing continues with the addition of the Broker of the credit enabled floor, also communicating with the Credit Manager for both deal confirmation and credit management.

If any credit management or credit decision making are carried out by the Broker, credit information stored by the Broker and the Credit Manager are synchronised with each other.

When a PB (prime broker) floor is enabled for credit, all of its PCs (prime customers) are also enabled for credit. Conversely, a PC floor is not enabled if the PB floor is not enabled.

The Broker indicates to the ARB at sign on time, if the floor is using the known credit approach or the Credit approach described herein, where the credit matrix is stored at a credit manager.

When the Broker starts up or detects that MQ comes up, the Broker provides to the Credit Manager summary credit information for each of its floors for which Credit has been activated. If the summary information does not match Credit Manager's view, then Credit Manager requests the Broker to provide detailed credit information for the mismatched floors. In response, the Broker provides the requested detailed information.

Credit Manager may also initiate synchronization with the Broker when Credit Manager comes up and the Broker is already up.

The Credit Manager requests whether or not the floor allows intrafloor dealing. The trading system responds to the Credit Manager's request with the intrafloor indication.

When the Credit Manager determines all summary information and any requested floor information is synchronised with its data, the Credit Manager sends a request to the Broker for the Credit Used amount for each credit group for the synchronized floor. The Broker provide to the Credit Manager the Credit Used amount for each credit group in the requested floor.

The Broker ensures that the Credit Used amount includes credit only for deals for which Deal Confirmations have already been sent to the Credit Manager.

An Ai (an automated trading tool) establishes each trading session for each trader of a given floor that has been configured in Ai with the "Floating Option", Ai provides to the trading system the Deal Code Throughput Allocation and the Trader Throughput Allocation. Deal Code Throughput Allocation (DCTA) is the number of orders permitted for the Deal Code within a time interval. Trader Throughput Allocation (TTA) is the number of orders permitted for the specific trader within a time interval.

The trading system stores the Deal Code Throughput Allocation and the Trader Throughput Allocation provided by Ai. If the Deal Code Throughput Allocation value changes with subsequent trading session establishments, the trading system replaces the stored value.

For the initial session establishment for the first trader of a given floor, the Deal Code Current Usage is set to the Trader Throughput Allocation. For subsequent session establishments for additional traders of a given floor, the trading system calculates the Deal Code Current Usage by adding the Trader Throughput Allocation to the existing Deal Code Current Usage (DCCU). For session terminations, the trading system calculates the Deal Code Current Usage by subtracting the Trader Throughput Allocation from the existing Deal Code Current Usage (DCCU). When the attempted establishment of a trading session would result in the Deal Code Current Usage exceeding the Deal Code Thoughput Allocation, the trading system does not update the Deal Code Current Usage. When the attempted establishment of a trading session would result in the Deal Code Current Usage exceeding the Deal Code Thoughput Allocation, the trading session is not allowed and an error message is returned to Ai. The error message includes: Trader Throughput Allocation; Deal Code Throughput Allocation; Deal Code Current Usage; and Deal Code Available Amount (DCTA-DCCU).

Figures 22, 23:
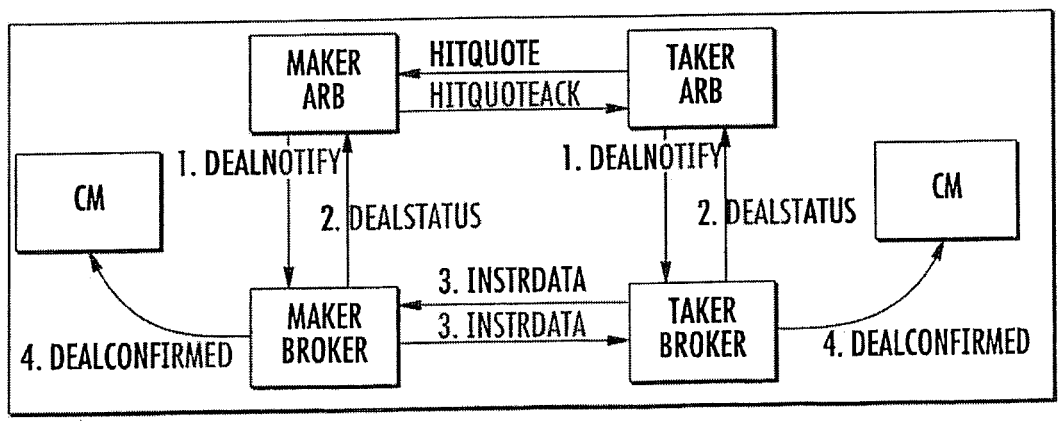
FIG. 22 is a table to illustrate an example embodiment of the present invention.
FIGS. 23 to 35 are schematic diagrams of embodiments of the present invention.

FIG. 22 is an example of Ai establishing a trading session for Ai traders on a given floor.

FIG. 23 illustrates a dealing flow among the Broker, ARB, and Credit Manager (CM) embodying an aspect of the present invention.

After the orders have been matched by the ARB (arbitrator), a deal notification from the ARB containing all existing deal information, trade date, and both Taker and Maker credit information is sent to both Brokers. Neither Broker recalculates credit and both Brokers use the credit information and trade date provided by the ARB. (The Brokers shall continue to calculate credit between the PB and PC at order submission for prime deals.) If the trade date provided by the ARB, is not the current trading day, then the credit amount is not added to the Group's credit used amount.

Each Broker records the deal when it receives the deal notification from the ARB. A deal is legally binding when either Broker records the deal.

In this arrangement, the Brokers do not exchange a deal verification and they do not assign a trade date. The trade date is provided on the deal notification from the ARB.

Both Brokers continue to exchange counterparty specific deal information with the counterparty Broker and continue to send deal status to the ARB. The deal status, in addition to deal information, contains its own credit information for the trading floor.

Each Broker sends a deal confirmation to the Credit Manager. In addition to deal information, it contains its own credit information. The deal confirmation also contains the total amount of credit used for the credit group.

The deal pending message is not displayed on the Transaction Panel. This is because there is no longer a pending state while credit is checked.

The BP-API simulates the current Deal Pending message for downstream applications.

For a Mixed Credit Approach, when only one trading floor is enabled for the credit approach described above using a credit manager, all current dealing processes remain in place. The deal confirmation message from the Broker to the Credit Manager is sent only from the Broker with the credit enabled floor.

Figure 24:
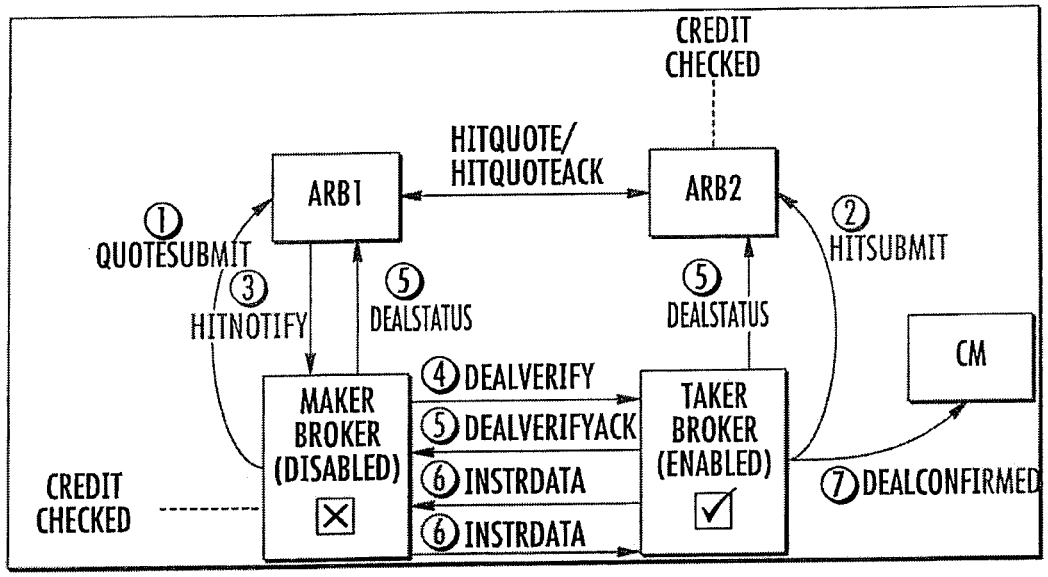

FIG. 24 illustrates a dealing message flow among the Broker, ARB, and Credit Manager when only the Taker Broker's floor is enabled for credit. This is an example where only the taker is enabled for credit and its a successful deal flow. That is to say, when the Taker Broker's floor is enabled and the Maker Broker's floor is not enabled for the credit approach described herein.

After the orders have been matched by the ARB, a hit notification from the ARB containing the Taker's credit information shall be sent to the Maker Broker. The trade date is not included on the hit notification. The Maker Broker confirms credit and sends a deal verification with the Taker's credit information to the Taker Broker. The Maker may have reduced the amount of the deal. The Taker Broker accepts the credit information, generates a trade date and sends a verification acknowledgement of the deal to the Maker Broker. If the Maker Broker had reduced the deal amount, then the Maker Broker proportionately reduces the Taker's credit. A deal is legally binding when the Taker Broker records the deal after receipt of a DealVerify message. Both Brokers continue to exchange counterparty specific deal information with the counterparty Broker and continue to send deal status to the ARB. The deal status, in addition to deal information, contains its own credit information for the trading floor. If the deal amount has been reduced, the deal status reflects the reduced credit amount. Only the Taker Broker sends a deal confirmation to the Credit Manager. In addition to deal information, it contains its own credit information for the trading floor. If the deal amount has been reduced, the deal confirmation reflects the reduced credit amount. The deal confirmation also contains the total amount of credit used for the credit group.

Figure 25:
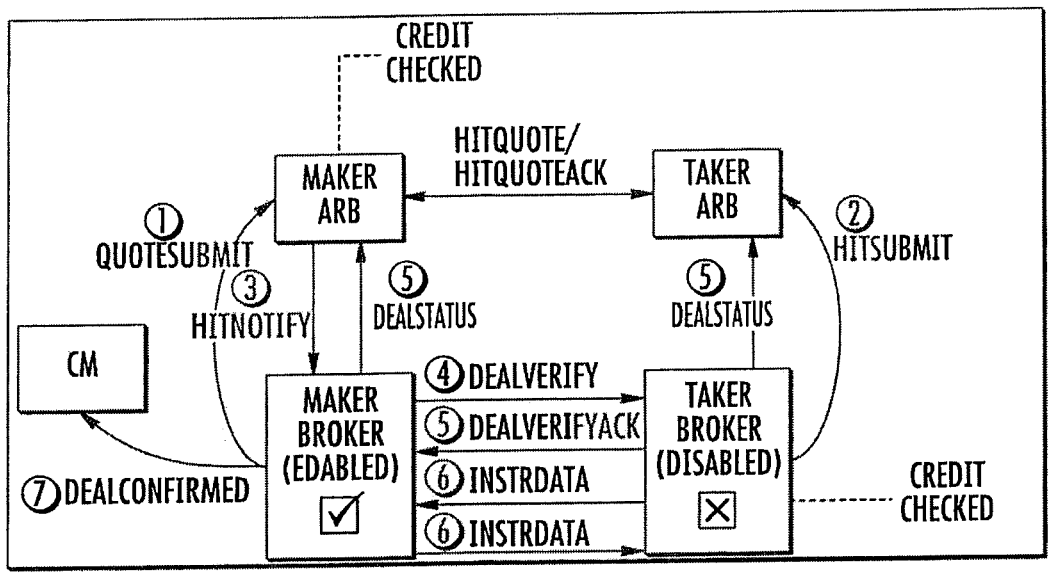

FIG. 25 illustrates a modified successful dealing flow among the Broker, ARB and Credit Manager when only the Maker Broker's floor is enabled for credit. That is to say, when the Maker Broker's floor is enabled and the Taker Broker's floor is not enabled for the credit approach described herein.

After the orders have been matched by the ARB, a hit notification from the ARB containing the Maker's credit information is sent to the Maker Broker. The Maker Broker accept the credit information and sends a deal verification with the Maker's credit to the Taker Broker. The Taker Broker confirms credit, generates a trade date, and sends a verification acknowledgement of the deal to the Maker Broker. The deal amount may be reduced by the Taker Broker. If the Taker Broker has reduced the deal amount, then the Taker Broker proportionately reduces the Maker's credit. A deal is legally binding when the Taker Broker records the deal after receipt of the DealVerify message. Both Brokers continue to exchange counterparty specific deal information with the counterparty Broker and continue to send deal status to the ARB. The deal status, in addition to deal information, contains its own credit information for the trading floor. If the deal amount has been reduced, the deal status reflects the reduced credit amount. Only the Maker Broker sends a deal confirmation to the Credit Manager. In addition to deal information, it contains its own credit information for the trading floor. If the deal amount has been reduced, the deal confirmation reflects the reduced credit amount. The deal confirmation also contains the total amount of credit used for the credit group.

Figure 26:
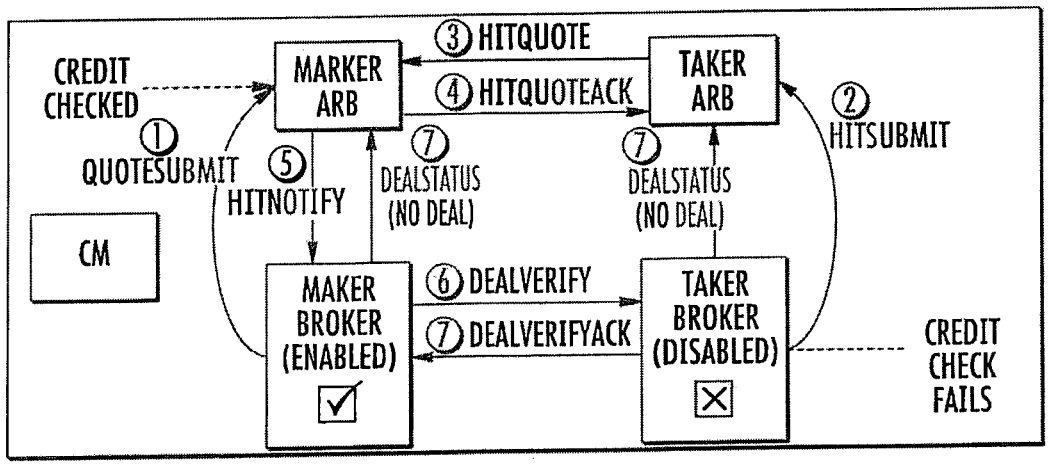

FIG. 26 illustrates an unsuccessful dealing flow when the Maker Broker's floor is enabled for credit and the Taker Broker fails for credit. That is to say, when the Maker Broker's floor is enabled and the Taker Broker's floor is not enabled for the credit approach described herein and the Taker Broker fails the credit check.

After orders have been matched by the ARB, a hit notification from the ARB containing the Maker's credit information is sent to the Maker Broker. The trade date is included on the hit notification. The Maker Broker accepts the credit information and sends a deal verification with the Maker's credit to the Taker Broker. When the Taker Broker checks credit and determines there is no credit, the Taker Broker sends a verification acknowledgement to the Maker Broker with the Maker's credit and indication of denial of the deal. Both Brokers continue to send deal status to the ARB. The deal status contains its own credit information for the trading floor if applicable, and indicates that there is no deal. Neither Taker Broker sends a deal confirmation to the Credit Manager.

Figure 27:
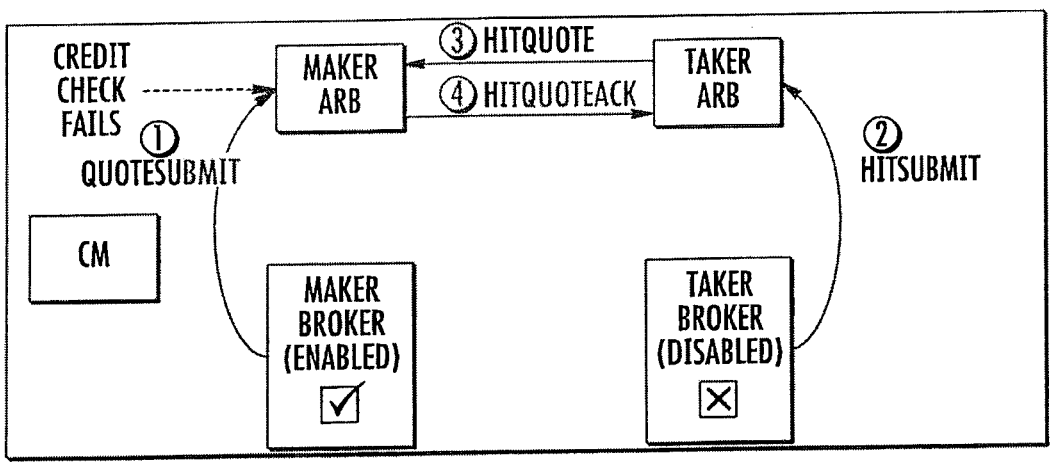

FIG. 27 illustrates an unsuccessful dealing flow when the Maker Broker's floor is enabled for credit and the Maker Broker fails for credit. When the Credit Engine at the Maker ARB fails the credit check the hit quote acknowledgement sent to the Taker ARB will indicate that there is no credit. If there are no other successful matches for the order, the Taker Broker is notified that hit was done for zero.

Figure 28:
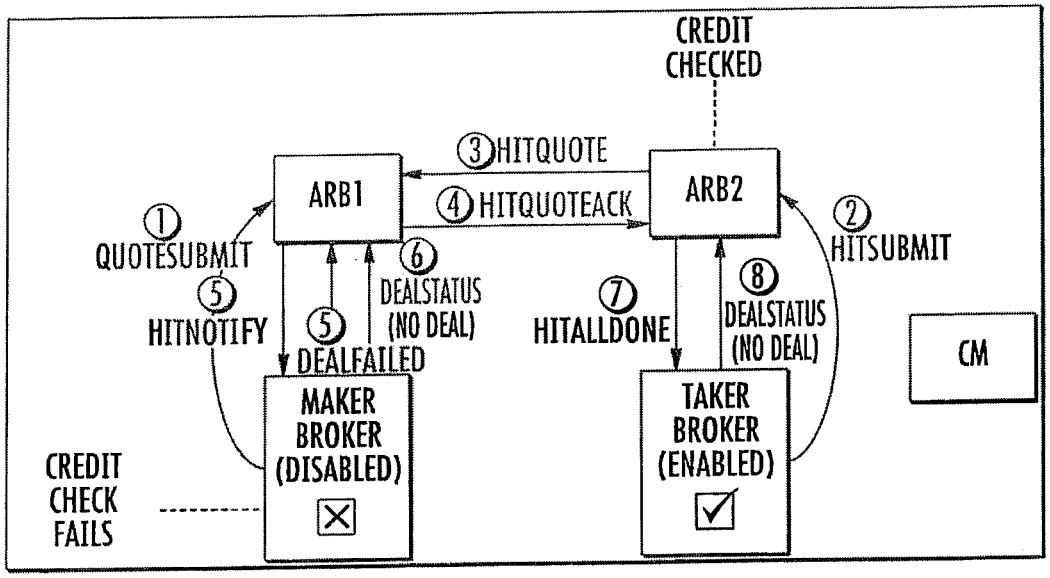

FIG. 28 illustrates an unsuccessful dealing flow when the Taker Broker's floor is enabled for credit and the Maker Broker fails for credit. That is to say, when the Maker Broker's floor is disabled and the Taker Broker's floor is enabled for the credit approach described herein and the Maker Broker fails the credit check.

After the orders have been matched by the ARB, a hit notification from the ARB containing the Taker's credit information is sent to the Maker Broker. The trade date is not included on the hit notification. When the Maker Broker checks credit and determines that there is no credit, the Maker Broker sends a Deal Failure message with the Taker's credit information, to the Maker ARB. Both Brokers continue to send deal status messages to the ARB. The deal status contains its own credit information for the trading floor, if applicable, and indicates that there is no deal.

In one arrangement, a Deal Status message is sent by the Broker to the ARB when the Maker Broker fails credit. In another arrangement, a Deal Status message is not sent by the Broker to the ARB when the Maker Broker fails credit.

Figure 29:
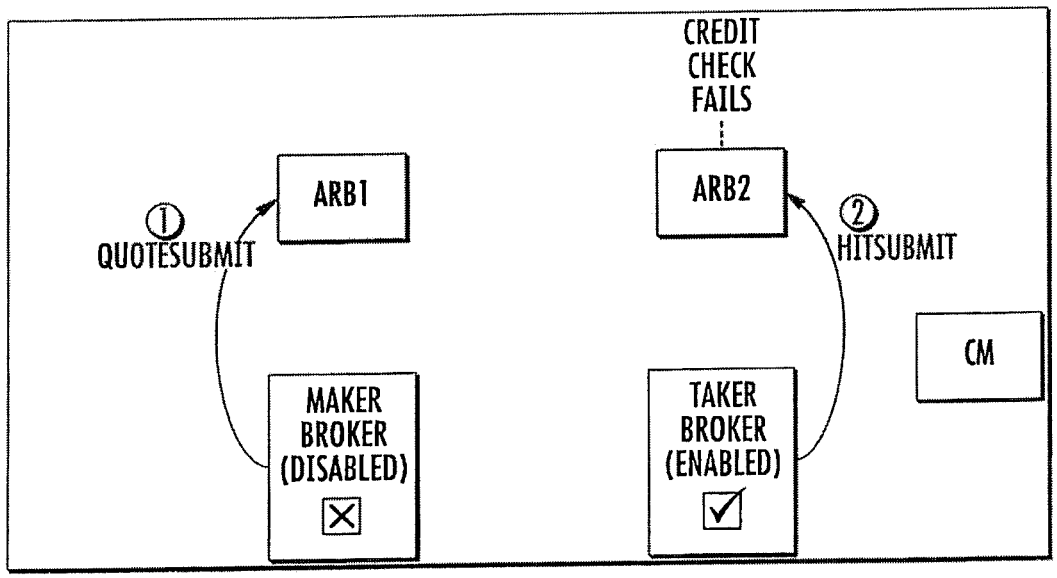

FIG. 29 illustrates an unsuccessful dealing flow when the Taker Broker's floor is enabled for credit and the Taker Broker fails for credit.

When the Credit Engine at the Taker ARB fails the credit check, there is no exchange of messages between the ARBs. If there are no other successful matches for the order, the Taker Broker is notified that the hit was done for zero.

We now turn to Amends and Interrupts of orders. The Broker does not assume that Order Amend requests or Order Interrupts are granted by the ARB, but must wait for the notification from the ARB before completing the Amend or Interrupt request. This requirement is applicable when either or both floors are enabled for the credit approach described herein. The trader will be unable to further amend or interrupt the order until the acknowledgement is received from the ARB For basket orders, the Broker needs to receive from the ARB, the price of one of the components of the deal. For Basket/Ruble, for example, the trading system needs the EUR/USD rate in the DealNotify message. The ARB provides the last dealt rate for EUR/USD. The ARB persists with Friday's last dealt rate for use on Monday morning, if necessary.

When both floors are enabled for Credit, deal ticket numbers and instructions, previously generated by the Taker Broker after the deal was verified and by the Maker Broker after the deal verification acknowledgement, are generated upon receipt of the deal notification from the ARB.

As regards deal tickets, when both floors are enabled for the credit approach described herein, for Deal Feed Alternative (DFA), the DST/DSM from which the tickets are generated by DFA, continues to contain only the ticket number from the side generating the status message.

When both floors are enabled for the credit approach described herein, for Deal Feed Client (DFC), the counterparty ticket number is exchanged in the instruction messages instead of the deal verification and deal verification acknowledgement messages.

For floors enabled for the credit approach described herein, the Broker no longer sends credit matrix information to the ARB. The ARB's credit matrix information comes from the Credit Engine.

Currently, the credit matrix indicates whether or not intrafloor dealing is on. When the credit matrix is not provided by the Broker, the Broker provides another mechanism to inform the ARB of intrafloor dealing.

TFA Updates: for floors enabled for the credit approach described herein, all Credit administrative related updates on the Broker are sent to the Credit Manager. The Credit administrative related updates are additions, modifications and deletions to: Unique Credit Group Identifier (unique within floor), Credit Groups, Default Daily Credit Limit, Adjustment Amount, counterparty floors, allow/disallow trading for counterparty floors, conversion rates for currencies, Continuous Linked Settlement (CLS), CLS currencies, CLS percentage, CLS enabled floors, NDF volatility, NDF scaling factor, NDF scaling method, and Credit Limit Currency (CLC).

The Broker waits for an acknowledgement from the Credit Manager for credit administrative related updates, prior to updating its database and providing the workstation a response message. When the Broker receives a positive acknowledgement, the Broker updates its database and provides a success message to the workstation informing the user that the request was processed. When the Broker receives a negative acknowledgement with an error code indicating that synchronization between the Credit Manager (CM) and the trading system is not required, the Broker updates its database, and provides a message to the workstation informing the user that the request is delayed. The text of the message is: "Your change has been submitted and will be applied shortly. If there are any issues, Customer Support will contact you". When the Broker receives a negative acknowledgement with an error code indicating that synchronization between CM and the trading system is required, the Broker: updates its database, provides a message to the workstation informing the user that the request is delayed (the message text given above is provided), and initiates the synchronization process with CM. When the Broker does not receive any acknowledgement within a configurable amount of time, the Broker: updates its database, provides a message to the workstation informing the user that the request is delayed (the message text given above is provided). Resynchronization will be initiated by either CM or Broker, depending upon the situation. The Broker prohibits a Prime Bank from including both a Spot counterparty and a Prime Customer in the same credit group. This constraint is due to the Broker making credit decisions for trading between PB and PC and Credit Engine making credit decisions for Spot to PB trading.

The Broker rolls over credit at the end of the trading day (5:00 pm New York time, Monday to Thursday and Saturday) as is done today. In addition, a message is sent to the Credit Manager indicating that the Broker's credit has been cleared for each Credit Group. A known arrangement is used for end-of-day credit reporting.

Deal recovery when both floors are enabled for the credit approach described herein is now discussed.

Figure 30:
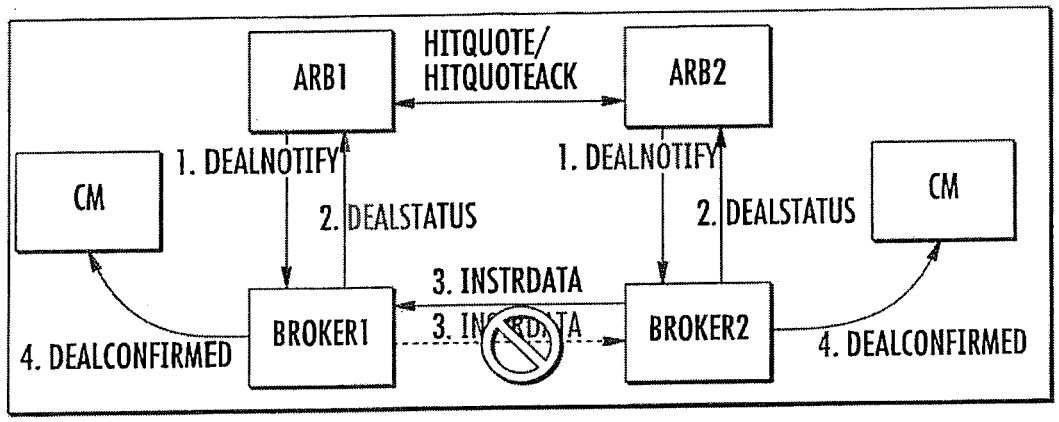

First missing instructions, as illustrated in FIG. 30, are discussed. When Broker2 receives deal notification from the ARB, but does not receive instructions from Broker1, after a configurable period of time, it sends a "deal in progress" message to all FSPs and a durable recovery message to Broker1, providing all of Broker2's order, credit and deal information, and requesting Broker1's instructions. Broken provides a durable recovery message with its order, credit, deal, and instructions to Broker2. If either Broker crashes before it has sent the message to FSP or the counterparty Broker, upon start up, the Broker continues the recovery process.

Figure 31:
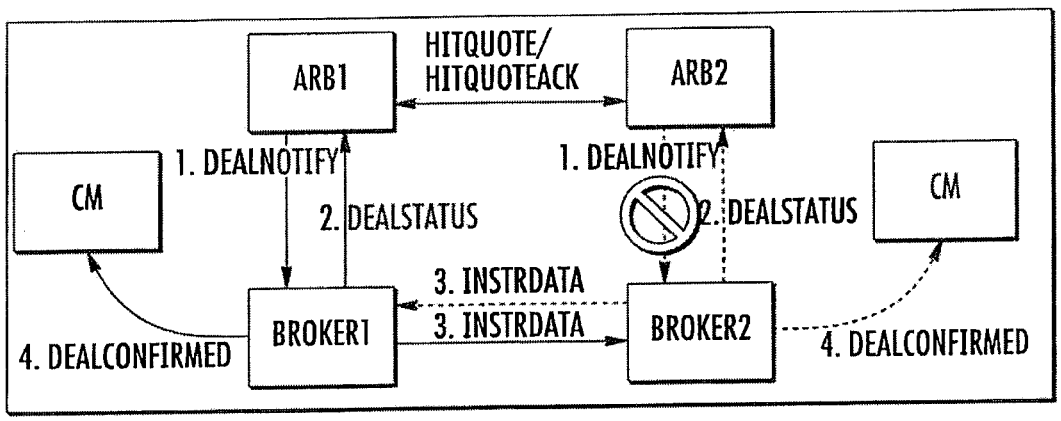

A missing deal notification from ARB is now discussed with reference to FIG. 31. When Broker2 receives instructions from Broker1, but does not receive deal notification from the ARB, after a configurable period of time, it sends a "deal in progress" message to all FSPs and a durable recovery message to Broker1, providing order, credit and instruction information, and requesting Broker1's deal information. Broken provides a durable recovery message with its order, credit, deal, and instructions for the order to Broker2. Broker2 sends the deal status to the ARB, and the deal confirmation to the Credit Manager. Broken does not send an instructions message to Broker2. If either Broker crashes before it has sent the message to FSP or the counterparty Broker, upon start up, the Broker continues the recovery process. Broker2 saves the deal id for a period of time, to ensure that it will not create a new deal if it receives the deal notification from the ARB.

Figure 32:
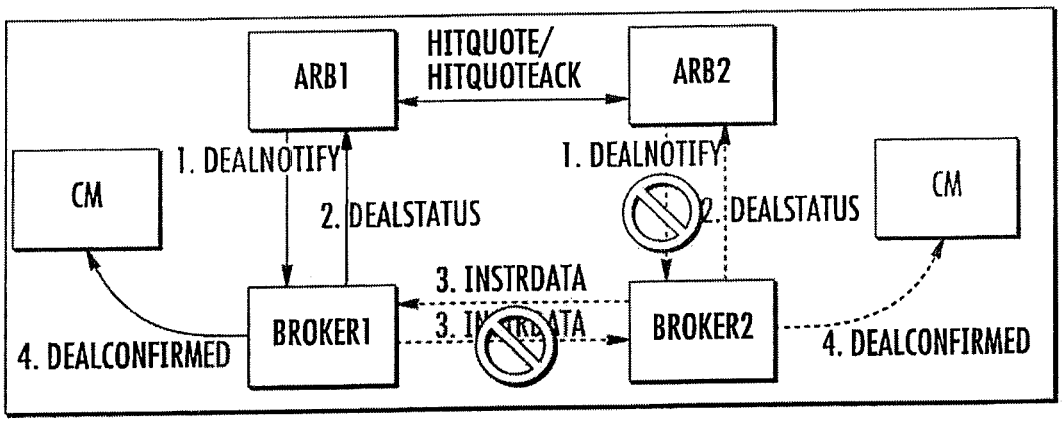

A missing deal notification and instructions is now discussed with reference to FIG. 32. When Broker2 receives neither instructions from Broker1, nor deal notification from the ARB, it later receives a recovery message from Broken providing its order, credit, deal information, and instructions, and requesting Broker2's instructions. With receipt of the deal information, Broker2 sends the deal status to the ARB, and the deal confirmation to the Credit Manager. Broker2 sends a deal in progress to all FSPs and a durable recovery message to Broker1 providing order, credit, deal information, and instructions. Broker2 saves the deal id for a period of time, to ensure that it will not create a new deal if it receives the deal notification from the ARB.

Figure 33:
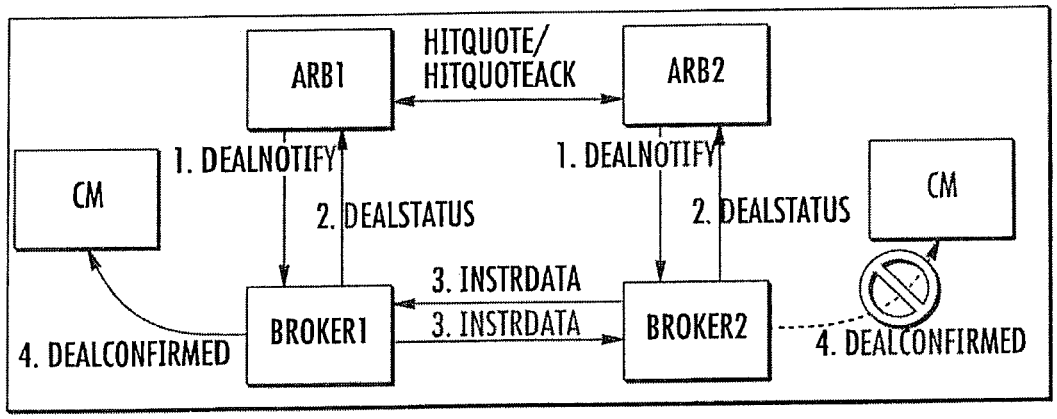

A missing deal confirmation is now discussed with reference to FIG. 33. When the Credit Manager does not receive the deal confirmation from Broker2, there is no recovery from the Broker's perspective. (CM would have been notified of the finalized deal by the ARB).

Figure 34:
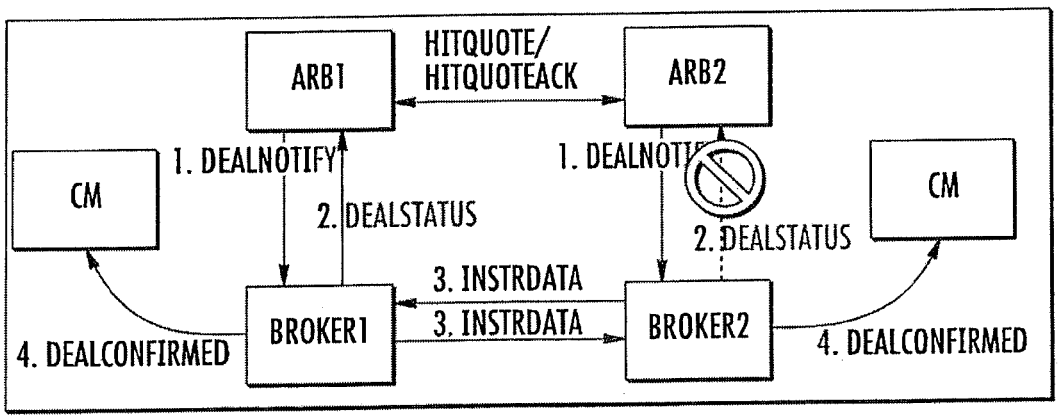

A missing deal status is now discussed with reference to FIG. 34. When the ARB does not receive the deal status from Broker2, there is no recovery from the Broker's perspective. (ARB will send E1 to FSP)

Figure 35:
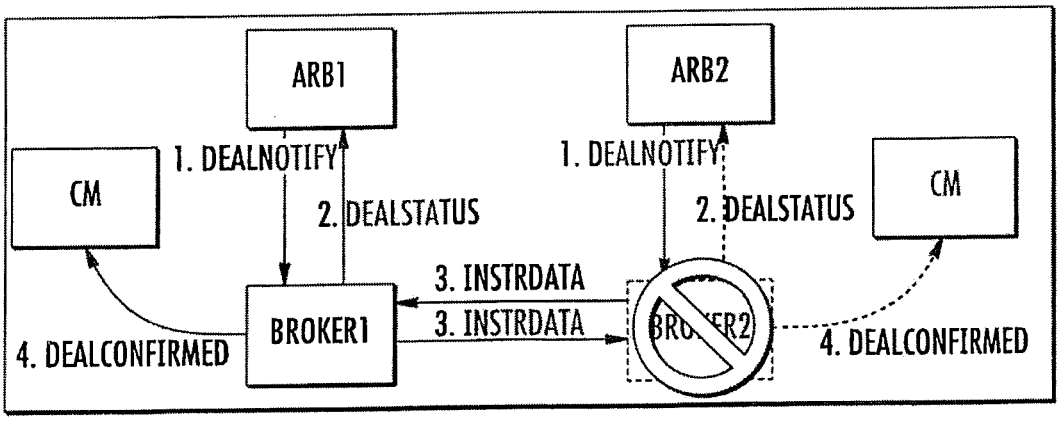

A broker being unavailable is now discussed with reference to FIG. 35. When Broker2 is not available, dealing messages are not received or sent. Deal recovery is initiated by Broker1 due to non-receipt of instructions. Broker1 sends a deal in progress message to all FSPs and a durable recovery message to the unavailable Broker2, providing its order, credit, deal information, and instructions, and requesting Broker2's instructions. The unavailable Broker2 picks-up Broker1's message when it becomes available. When available, Broker2 sends the deal status to the ARB, and the deal confirmation to the Credit Manager. The Broker sends a "deal in progress" message to all FSPs and a durable recovery message to Broker1 providing its order, credit, deal information, and instructions.

Deal recovery when only one floor is enabled for the credit approach described herein follows the known "Deal in Doubt" process. If the deal recovery fails, the deal status message sent to the ARB includes credit information.

CQI is implemented for all Brokers and the GQI option on the OPS web page is disabled. The credit application described herein is not managing credit between PBs and PCs. If a Broker crashes during a deal in progress process, after the Broker has sent its recovery messages, MQ will ensure that the messages are delivered.

Ai (an automated trading interface) integration into the system is now described.

For an Ai multi session, multiple traders of a Deal Code are supported on a single Ai Instance. Multiple deal codes can be supported on a single Ai instance.

Ai subscribes for market views at a floor level. There may be multiple floors within an Ai server and each floor may contain multiple users.

In support of Ai multi session, the trading system adds floor to the authentication of an Ai Client, so it includes: Ai server's IP address, User Id, Password, and Floor.

The trading system allows the same Ai server IP address to belong to more than one trading system domain, thus allowing multiple floors from a single Ai server to log on to a single Broker or multiple Brokers. When adding an IP address to a Broker, if the IP address is in multiple domains, the "super user" is notified of the multiplicity in a pop-up window. Ai identifies itself to the BP-API as a multi session server with GA-like property settings.

An Ai instance that caters to multiple floors needs an MF-RTV. The trading system provides to Ai a mechanism for Ai to request Market Views at a floor level through a proxy user session for each floor. Only the proxy user subscribes for and receives Market Views. Ai does not manage the aggregation of the Market View subscriptions of the Ai traders of a floor. Ai manages the distribution of the appropriate market views to each trader of the floor. Different traders may subscribe to market views for different currency pairs. The local RTV configuration is updated with the Ai floors to which the RTV provides market views for each Broker. The trading system provides Ai with the ability to connect/authenticate with a Broker that caters to the Ai User's floor. An Ai floor enabled for MF-RTV is identifiable on the Broker Ops Webpage.

The three highest trades and the three lowest trades of the day by currency pair are available in a Market Data Panel. The trading day is defined the same as for all other market data, which is:

trading begins Monday 5:00 am Sydney time
trading ends daily 5:00 pm New York time
trading ends for the week Friday 5:00 pm New York time.

The trading system subscribes to NRM for the (global) Current day Daily High/Low Deals. The Market Data Panel drop down menu has an entry for "Daily High Low Deals". Selection of "Daily High Low Deals" displays a Daily High Low Deals panel with sixteen available positions for the display of currency pairs. The panel allows the trader to select up to sixteen currency pairs to be displayed. The trader selects a specific currency pair and the three daily high and the three daily low deals are displayed for the selected currency pair.

For each dealt rate, the display reflects:
the three lowest dealt rates with the highest rate on the top of the list and the lowest rate on the bottom of the list;
the three highest dealt rates for the trading day with the highest rate on the top of the list and the lowest rate on the bottom of the list;
the dealt time, formatted HH:MM:SS; and
the designation of Paid or Given.

Until sufficient trades have occurred, the rates displayed may reflect less than three dealt rates. In that case the second and/or third entries are empty. If multiple deals are at the same High/Low, the display reflects multiple deals with the same rates with different dealt times. When there are multiple deals at the same rate, the deals shall be presented in descending order with the most current time at the top.

The implementation of settlement dates for the Gulf Coast Currency pairs is by obtaining the settlement dates from FSP. The settlement dates shall be effective in the trading system for the next business day.

The invention has been described with reference to example implementations, purely for the sake of illustration. The invention is not to be limited by these, as many modifications and variations would occur to the skilled person. The invention is to be understood from the claims that follow.

The invention claimed is:

1. A method for reducing latency in trading a fungible instrument on a computerized system comprising a plurality of arbitrator computers each of which is associated with a different one of a plurality of credit manager computers located in a same location as the associated arbitrator computer, wherein each of the associated arbitrator computer is located geographically more proximate to an associated subset of trader workstations than the other arbitrator computers so as to provide low network latency between a time an electronic trade order transmitted from a trader workstation of the associated subset of trader workstations and received by the computerized system and a time that a match is made by the associated arbitrator computer, the method comprising:

(a) storing, by the computerized system in each of the plurality of credit manager computers, a different one of a plurality of partial pre-authorization credit matrices, each of the plurality of partial pre-authorization credit matrices storing data indicative of only credit extended between a subset of a plurality of trading entities associated with a particular credit manager computer and a remainder of the plurality of trading entities associated with the other credit manager computers;

(b) the computerized system receiving a plurality of electronic trade orders for the fungible instrument, each electronic trade order:
(i) being received during a trading period having start time and an end time;
(ii) being associated with a respective trading entity of the plurality of trading entities;
(iii) being an order to buy or an order to sell the fungible instrument;
(iv) specifying a quantity of the fungible instrument to buy or sell but not a price at which to buy or sell the fungible instrument; and
(v) received from a trader workstation by the arbitrator computer associated with the subset of trader workstations which includes the trader workstation from which the electronic trade order was received; and (c) forwarding, by the computerized system, each of the received plurality of electronic trade orders to the one of the plurality of credit manager computers associated with the arbitrator computer which received the electronic trade order and located in the same location;

(d) each of the plurality of credit manager computers accessing the stored partial pre-authorization credit matrix to determine whether, for a pair of the received trade orders which are compatible, the trading entities associated therewith have a predetermined level of credit, the credit manager not accessing any of the partial pre-authorization credit matrices stored in the others of the plurality of credit managers, and notifying the associated arbitrator computer of the determination;

(e) each of the plurality of arbitrator computers matching compatible electronic trade orders during the trading period based on quantity but not price only when the associated credit manager computer has determined that the trading entities associated therewith have a predetermined level of credit;

(f) in response to the match of a particular pair of compatible electronic trade orders, the arbitrator computer forwarding, during the trading period, a respective first deal ticket to at least one of the trading entities associated with the particular pair of compatible electronic trade orders, the first deal ticket identifying the matched compatible electronic trade orders of the particular pair and including an estimated price using an indicative rate of the matched fungible instrument; and (g) after the end time of the trading period, the arbitrator computer applying a fixing price, which is different than the estimated price, to the electronic trade orders that were matched during the trading period based upon pricing information received from an outside source and forwarding a respective second deal ticket to at least one of the trading entities associated with the particular pair of compatible electronic trade orders, the second deal ticket identifying the matched compatible electronic trade orders of the particular pair and including the fixing price.

2. The method according to claim 1, wherein the electronic trading orders are received by the computerized system during the trading period.

3. The method according to claim 1, wherein a trader receives a notice that the trading period is about to expire.

4. The method according to claim 1, wherein a trader receives a notice that a time for receiving electronic trade orders is about to expire.

5. The method according to claim 1, wherein after the arbitrator computer applies a price to the electronic trade orders that were matched during the trading period, a trader triggers release of a deal ticket reflecting the priced, matched order.

6. The method according to claim 1, further comprising issuing a deal ticket for a matched order which has been priced.

7. The method according to claim 6, wherein the deal ticket is issued no later than at the end time of the trading period.

8. The method according to claim 6, wherein the deal ticket is automatically issued.

9. The method according to claim 6, wherein none of the electronic trade orders provide parameters for the trading price.

10. The method according to claim 1, wherein the matching of compatible electronic trade orders is based on credit.

11. The method of claim 1, further comprising informing a user of the system when one of the electronic trade orders is matched or partially matched.

12. The method of claim 1, further comprising a user of the electronic trading system amending the quantity of an electronic trade order associated with the user.

13. The method according to claim 1, wherein the electronic trade orders are first electronic trade orders, the trading period is a first trading period and the pricing information is first pricing information, and after the end time of the first trading period, the computerized system receives a second plurality of electronic trade orders for the fungible instrument, each second electronic trade order being associated with a second trading period having start time and an end time, each of the plurality of second electronic trade orders being either an order to buy or an order to sell the fungible instrument and specifying a quantity of the fungible instrument to buy or sell but not a price at which to buy or sell the fungible instrument;

the arbitrator computer matching compatible second electronic trade orders based on quantity but not price during the second trading period;

the arbitrator computer automatically cancelling, without user intervention, all of the second electronic trade orders associated with the second trading period that were not matched during the second trading period; and after the end time of the second trading period, the arbitrator computer applying a price to the second electronic trade orders that were matched during the second trading period based upon second pricing information received from the outside source.

14. The method according to claim 13, wherein the first and second trading periods take place in a single trading day.

15. The method according to claim 1, wherein before a pair of compatible electronic trade orders are matched, they are screened for credit.

16. The method according to claim 1, wherein, for each respective first deal ticket, the estimated price is set at the time of the match associated with the respective first deal ticket.

17. A computerized trading system to reduce latency in trading a fungible instrument, the computerized trading system comprising:

(a) a plurality of arbitrator computers, each of which is associated with a different one of a plurality of credit manager computers located in a same location as the associated arbitrator computer, wherein each of the associated arbitrator computer is located geographically more proximate to an associated subset of trader workstations than the other arbitrator computers so as to provide low network latency between a time an electronic trade order transmitted from a trader workstation of the associated subset of trader workstations and received by the computerized system and a time that a match is made by the associated arbitrator computer, each of the plurality of credit manager computers having stored therein a different one of a plurality of partial pre-authorization credit matrices, each of the plurality of partial pre-authorization credit matrices storing data indicative of only credit extended between a subset of a plurality of trading entities associated with a particular credit manager computer and a remainder of the plurality of trading entities associated with the other credit manager computers;

(b) an order store configured to receive a plurality of electronic trade orders for the fungible instrument, each electronic trade order:
being received during a trading period having start time and an end time;
being associated with a respective trading entity of the plurality of trading entities;
being an order to buy or an order to sell the fungible instrument; and
specifying a quantity of the fungible instrument to buy or sell but not a price at which to buy or sell the fungible instrument; and
received from a trader workstation by the arbitrator computer associated with the subset of trader workstations which includes the trader workstation from which the electronic trade order was received;
(c) each of the plurality of credit manager computers configured to access the stored partial pre-authorization credit matrix to determine whether, for a pair of the received trade orders forwarded thereto which are compatible, the trading entities associated therewith have a predetermined level of credit, the credit manager not configured to access any of the partial pre-authorization credit matrices stored in the others of the plurality of credit managers, and notify the associated arbitrator computer of the determination;
(d) each of the plurality of arbitrator computers being programmed to operate as a matching engine and matching compatible electronic trade orders during the trading period based on quantity but not price only when the associated credit manager computer has determined that the trading entities associated therewith have a predetermined level of credit;
(e) each of the plurality of arbitrator computers being programmed to, in response to the match of a particular pair of compatible electronic trade orders and during the trading period, forward a respective first deal ticket to at least one of the trading entities associated with the particular pair of compatible electronic trade orders, the first deal ticket identifying the matched compatible electronic trade orders of the particular pair and including an estimated price using an indicative rate of the matched fungible instrument; and
(f) each of the plurality of arbitrator computers being programmed to:
(i) after the end time of the trading period, apply a fixing price, which is different than the estimated price, to the electronic trade orders that were matched during the trading period based upon pricing information received from an outside source; and
(ii) forward a respective second deal ticket to at least one of the trading entities associated with the particular pair of compatible electronic trade orders, the second deal ticket identifying the matched compatible electronic trade orders of the particular pair and including the fixing price.

18. The computerized trading system according to claim 17, wherein the electronic trading orders are received by the computerized system during the trading period.

19. The computerized trading system according to claim 17, wherein a trader receives a notice that the trading period is about to expire.

20. The computerized trading system according to claim 17, wherein a trader receives a notice that a time for receiving electronic trade orders is about to expire.

21. The computerized trading system according to claim 17, wherein after the arbitrator computer applies a price to the electronic trade orders that were matched during the trading period, a trader triggers release of a deal ticket reflecting the priced, matched order.

22. The computerized trading system according to claim 17, further comprising issuing a deal ticket for a matched order which has been priced.

23. The computerized trading system according to claim 22, wherein the deal ticket is issued no later than at the end of the trading period.

24. The computerized trading system according to claim 22, wherein the deal ticket is automatically issued.

25. The computerized trading system according to claim 17, wherein none of the electronic trade orders provide parameters for the trading price.

26. The computerized trading system according to claim 17, wherein the matching of compatible electronic trade orders is based on credit.

27. The computerized trading system according to claim 17, further comprising informing a user of the system when one of his electronic trade orders is matched or partially matched.

28. The computerized trading system according to claim 17, further comprising a user of the electronic trading system amending the quantity of an electronic trade order associated with the user.

29. The computerized trading system according to claim 17, wherein the electronic trade orders are first electronic trade orders, the trading period is a first trading period, and after the end time of the first trading period, the computerized system receives a second plurality of electronic trade orders for the fungible instrument, each second electronic trade order being associated with a second trading period having a start time and an end time, each of the plurality of second electronic trade orders being either an order to buy or an order to sell the fungible instrument and specifying a quantity of the fungible instrument to buy or sell but not a price at which to buy or sell the fungible instrument;
the arbitrator computer matching compatible second electronic trade orders based on quantity but not price during the second trading period;
the arbitrator computer automatically cancelling, without user intervention, all of the second electronic trade orders associated with the second trading period that were not matched during the second trading period; and
after the end time of the second trading period, the arbitrator computer applying a price to the second electronic trade orders that were matched during the second trading period based upon pricing information received from the outside source.

30. The computerized trading system according to claim 29, wherein the first and second trading periods take place in a single trading day.

31. The computerized trading system according to claim 29, wherein the matching of compatible electronic trade orders is based on credit.

32. The method according to claim 17, wherein the matching of compatible electronic trade orders is based on credit.

33. The computerized trading system according to claim 17, wherein before a pair of compatible electronic trade orders are matched, they are screened for credit.

34. The computerized trading system according to claim 17, wherein, for each respective first deal ticket, the estimated price is set at the time of the match associated with the respective first deal ticket.

* * * * *